(12) United States Patent
Park et al.

(10) Patent No.: US 12,008,248 B2
(45) Date of Patent: Jun. 11, 2024

(54) SYSTEMS, METHODS, AND DEVICES FOR UTILIZATION AWARE MEMORY ALLOCATION

(71) Applicant: Samsung Electronics Co., Ltd., Suwon-si (KR)

(72) Inventors: Heekwon Park, San Jose, CA (US); Tong Zhang, Mountain View, CA (US); Yang Seok Ki, Palo alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 17/507,775

(22) Filed: Oct. 21, 2021

(65) Prior Publication Data

US 2023/0017019 A1 Jan. 19, 2023

Related U.S. Application Data

(60) Provisional application No. 63/221,468, filed on Jul. 13, 2021.

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0644* (2013.01)

(58) Field of Classification Search
None
See application file for complete search history.

(56) References Cited

U.S. PATENT DOCUMENTS

| 9,043,531 | B2 | 5/2015 | Calvert et al. |
| 9,436,599 | B2 | 9/2016 | Cheng et al. |
| 9,779,021 | B2 | 10/2017 | Camp et al. |
| 11,550,502 | B2 * | 1/2023 | Lee ........................ G06F 3/0679 |
| 2013/0159765 | A1 * | 6/2013 | Hiramatsu .......... G06F 11/1435 |
| | | | 711/170 |

(Continued)

FOREIGN PATENT DOCUMENTS

| CN | 111176883 A | 5/2020 |
| CN | 108628753 B | 2/2021 |

OTHER PUBLICATIONS

European Extended Search Report for Application No. 22172245.7, dated Nov. 3, 2022.

*Primary Examiner* — Midys Rojas
(74) *Attorney, Agent, or Firm* — Renaissance IP Law Group LLP

(57) ABSTRACT

A method may include receiving, from a process, a memory allocation request for a memory system comprising a first channel having a first channel utilization and a second channel having a second channel utilization, selecting, based on the first channel utilization and the second channel utilization, the first channel, and allocating, to the process, a page of memory from the first channel. The selecting may include selecting the first channel based on a balanced random policy. The selecting may include generating a ticket based on a random number and a number of free pages, comparing the ticket to a number of free pages of the first channel, and selecting the first channel based on the comparing. The selecting may include selecting the first channel based on a least used channel policy.

19 Claims, 19 Drawing Sheets

(56) References Cited

U.S. PATENT DOCUMENTS

| | | |
|---|---|---|
| 2017/0108911 A1 | 4/2017 | Chun et al. |
| 2020/0125503 A1 | 4/2020 | Graniello et al. |
| 2021/0132816 A1* | 5/2021 | Jo .................... G06F 12/0246 |

* cited by examiner

SYSTEMS, METHODS, AND DEVICES FOR UTILIZATION AWARE MEMORY ALLOCATION

CROSS-REFERENCE TO RELATED APPLICATIONS

This application claims priority to, and the benefit of, U.S. Provisional Patent Application Ser. No. 63/221,468 titled "Systems, Methods, and Apparatus for Flash Core and Channel Aware Memory Allocator" filed Jul. 13, 2021 which is incorporated by reference.

TECHNICAL FIELD

This disclosure relates generally to memory systems, and more specifically to systems, methods, and devices for utilization aware memory allocation.

BACKGROUND

A memory allocation scheme may allocate one or more pages of device attached memory to a process such as a program, an application, a service, and/or the like, in response to an allocation request from the process. The process may specify an amount of memory to allocate and one or more devices from which the memory may be allocated. The memory allocation scheme may select the one or more pages of memory from the specified device based on the amount of memory requested in the allocation request.

The above information disclosed in this Background section is only for enhancement of understanding of the background of the invention and therefore it may contain information that does not constitute prior art.

SUMMARY

A method for memory allocation may include receiving, from a process, a memory allocation request for a memory system comprising a first channel having a first channel utilization and a second channel having a second channel utilization, selecting, based on the first channel utilization and the second channel utilization, the first channel, and allocating, to the process, a page of memory from the first channel. The selecting may include selecting the first channel based on a balanced random policy. The selecting may include generating a ticket based on a random number and a number of free pages, comparing the ticket to a number of free pages of the first channel, and selecting the first channel based on the comparing. The selecting may include selecting the first channel based on a least used channel policy. The selecting may include comparing a first number of free pages of the first channel to a second number of free pages of the second channel, and selecting the first channel based on the comparing. A page frame number for the page of memory from the first channel may include a channel identifier portion. The memory allocation request may include a requested order, and the allocating may include checking a first group of one or more lists of pages, wherein the one or more lists of pages of the first group may be based on a first order and arranged by channel. A first list, corresponding to the first channel, of the one or more lists of pages of the first group may include an entry for a page of the requested order, and the allocating may further include allocating, to the process, the page of the requested order from the first list of the one or more lists of pages of the first group. The allocating may further include checking a second group of one or more lists of pages, wherein the one or more lists of pages of the second group may be based on a second order and arranged by channel. A first list, corresponding to the first channel, of the one or more lists of pages of the second group may include an entry for a page of the requested order, and the allocating may further include allocating, to the process, the page of the requested order from the first list of the one or more lists of pages of the second group. The memory system may include a first media core and a second media core, the first channel may be associated with the first media core, and the second channel may be associated with the second media core. The memory system may include a first device having a first device utilization and a second device having a second device utilization, the first channel and the second channel may be associated with the first device, and the method may further include selecting, based on the first device utilization and the second device utilization, the first device for the memory allocation request.

A system may include a storage device including a device interface, a first channel having a first channel utilization, and a second channel having a second channel utilization; a host including a host interface in communication with the device interface, and a memory allocator configured to receive, from a process, a memory allocation request; and channel selection logic configured to select, based on the memory allocation request, the first channel based on the first channel utilization and the second channel utilization, and allocate, to the process, a page of memory of the first channel. The storage device may be a first storage device having a first device utilization, and the system may further include a second storage device having a second device utilization, wherein the memory allocator may include device selection logic configured to select, based on the first device utilization and the second device utilization, the first storage device for the memory allocation request. The device interface may include a memory coherent interface, and the host interface may include a memory coherent interface. The page of memory may be configured as device attached memory. The storage device may include a first media core and a second media core, the first channel may be associated with the first media core, and the second channel may be associated with the second media core.

An apparatus may include a memory allocator configured to receive, from a process, a memory allocation request, the memory allocator comprising channel selection logic configured to select, based on a first channel utilization of a first memory channel and a second channel utilization of a second memory channel, the first memory channel, and allocate, to the process, one or more pages of memory from the first memory channel. The first memory channel may be associated with a first device having a first device utilization, the second memory channel may be associated with a second device having a second device utilization, and the memory allocator may further include device selection logic configured to select, based on the first device utilization and the second device utilization, the first device for the memory allocation request. The memory allocator may further include page allocation logic configured to allocate the one or more pages of memory from the first memory channel based on an order of the memory allocation request.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 10A illustrates an example embodiment of a page frame numbering scheme having multiple consecutive pages belonging to the same channel in accordance with example embodiments of the disclosure.

FIG. 10B illustrates the example embodiment of the page frame numbering scheme illustrated in FIG. 10A after a page allocation operation in accordance with example embodiments of the disclosure.

DETAILED DESCRIPTION

Figure 1:
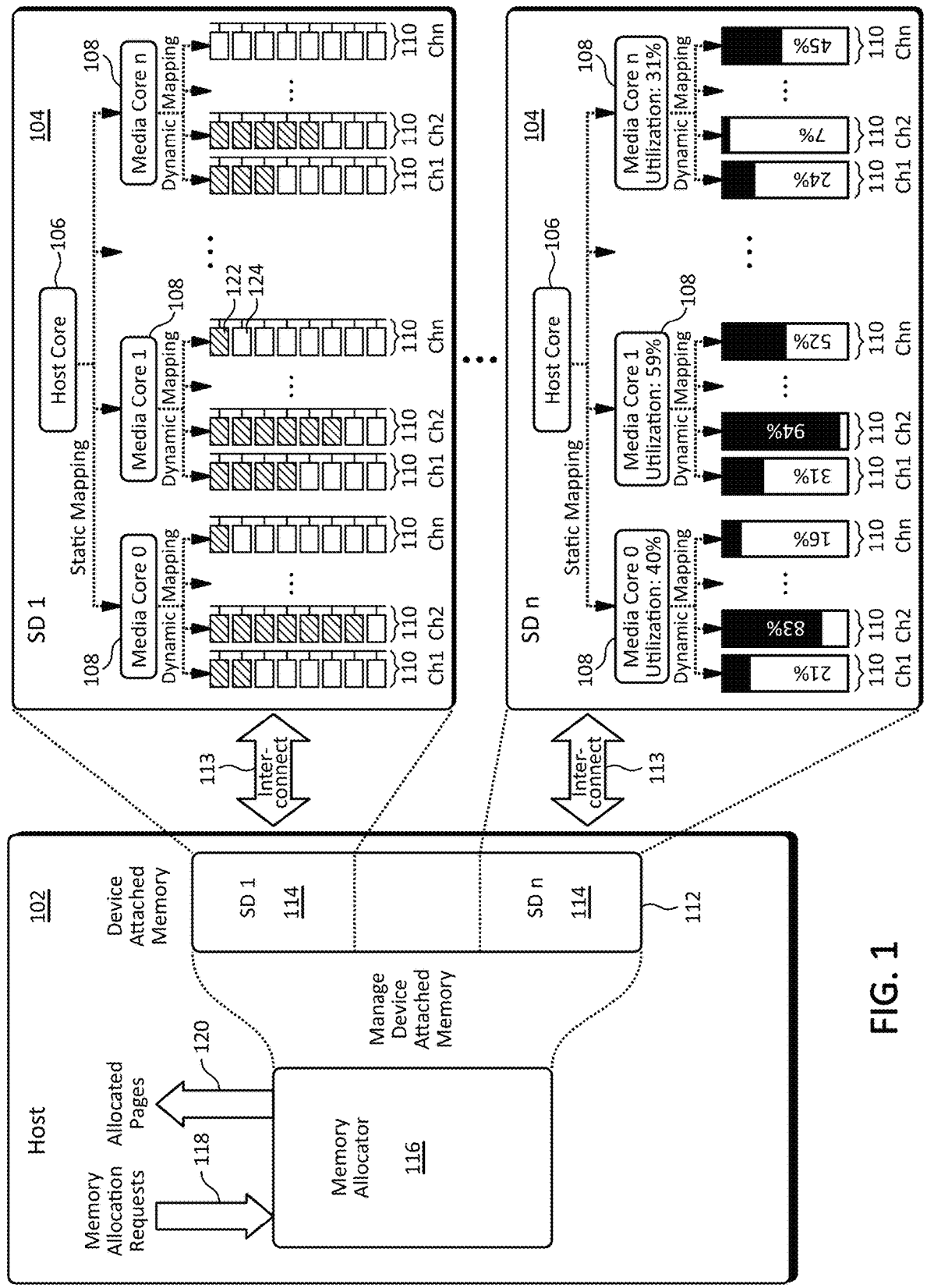
FIG. 1 illustrates an embodiment of a memory allocation scheme in accordance with example embodiments of the disclosure.

In some memory systems, memory pages may be allocated in a manner that may result in an uneven distribution of pages between memory channels in one or more storage devices. An uneven distribution of pages may degrade performance, for example, by increasing tail latency, reducing bandwidth utilization, reducing channel parallelism, and/or the like.

In a memory allocation scheme in accordance with example embodiments of the disclosure, allocated memory pages may be distributed relatively evenly across memory channels. The memory pages may be distributed, for example, by allocating pages in channels that may have lower utilization. Depending on the implementation details, this may distribute input and/or output (I/O) traffic for the memory pages in a manner that may improve system performance, for example, by increasing bandwidth utilization and/or channel parallelism. Moreover, depending on the implementation details, distributing I/O traffic across memory channels based on utilization may mitigate tail latency, for example, by balancing workloads across the memory channels.

In some embodiments, a host may include a memory allocator configured to implement a utilization aware allocation scheme that may distribute memory pages across channels in one or more devices. Each of the devices may have one or more media cores (e.g., flash cores), and each of the media cores may have one or more memory channels.

In some embodiments, a memory allocator may include device selection logic, channel selection logic, and/or page allocation logic. In response to a memory allocation request, the device selection logic may select one of multiple devices based on the relative utilization of each device. After the device selection logic selects a device for the allocation request, the channel selection logic may select a channel within the device based on the relative utilization of each channel. Because the channels within a device may be associated with multiple media cores, selecting a channel may also involve selecting a media core. After the channel selection logic selects a channel for the memory allocation request, the page allocation logic may allocate one or more pages within the channel based, for example, on the level or order of the request (e.g., the number of memory pages requested).

A channel allocation scheme in accordance with example embodiments of the disclosure may implement any suitable policy for distributing memory allocations across channels based on the relative utilizations of the channels. For example, a balanced random policy may use a random number to spread allocations over channels in a manner that may favor channels with more free pages. As another example, a least used channel first service policy may allocate memory pages in a channel with the highest number of free pages.

In some embodiments, one or more devices may be interfaced to one or more hosts through a memory coherent interconnect. The one or more devices may be configured, for example, as device attached memory.

The principles disclosed herein have independent utility and may be embodied individually, and not every embodiment may utilize every principle. However, the principles may also be embodied in various combinations, some of which may amplify the benefits of the individual principles in a synergistic manner.

FIG. 1 illustrates an embodiment of a memory allocation scheme in accordance with example embodiments of the disclosure. The system illustrated in FIG. 1 may include a host 102 and one or more storage devices (SDs) 104 which may be indicated as SD 1, . . . , SD n. Each of the storage devices 104 may include a host core 106 and one or more media cores 108 which may be indicated as Media Core 0, Media Core 1, . . . , Media Core n. The host core 106 may communicate with the host 102, for example, through a memory coherent interconnect and/or protocol as described below.

Each of the media cores 108 may control access to one or more memory channels 110, each of which may include pages of memory arranged, for example, in blocks. The memory channels 110 associated with each media core 108 may be designated as Ch1, Ch2, . . . , Chn.

The storage devices 104, media cores 108, and memory channels 110 illustrated in FIG. 1, as well as any other storage devices, media cores, and/or memory channels disclosed herein, may be implemented with any memory storage media. For example, in some embodiments, the storage devices 104 may be implemented as solid state drives (SSDs), the media cores 108 may be implemented as flash cores, and the memory channels 110 may be implemented with flash memory (e.g., not-AND (NAND) flash memory). The principles of this disclosure, however, may be implemented with any type of storage device using any type of storage media including any other type of solid state media, magnetic media, optical media, and/or the like. For example, in some embodiments, a storage device may be implemented as an SSD based on persistent memory such as cross-gridded nonvolatile memory, memory with bulk resistance change, phase change memory (PCM) and/or the like, or any combination thereof.

Some or all of the storage media (e.g., flash memory) of the storage devices 104 may be configured as device attached memory 112 that may be accessible to the host 102 (e.g., using a virtual addressing scheme). The device attached memory 112 may include regions 114 corresponding to the storage devices SD 1, SD 2, . . . , SD n. The host 102 may access the storage devices 104 through an interconnect 113 which, in some embodiments, may be implemented with a memory semantic and/or memory coherent interconnect such as Compute Express Link (CXL), and/or using a memory coherent protocol such as CXL.mem. However, embodiments may also be implemented with any other interfaces and/or protocols including cache coherent and/or memory semantic interfaces and/or protocols such as Gen-Z, Coherent Accelerator Processor Interface (CAPI), Cache Coherent Interconnect for Accelerators (CCIX), and/or the like.

The host 102 may include a memory allocator 116 that may receive memory allocation requests 118 from processes such as programs, applications, services, kernels, and/or the like. A memory allocation request 118 may specify a number of pages being requested. The number of pages requested may correspond to an order of the request (which may also be referred to as a level) for a buddy memory allocation scheme. In some embodiments, a memory allocation request 118 may also specify a storage device 104 (e.g., at a node, zone, and/or the like) from which to allocate the memory. In some embodiments, the memory allocation request 118 may rely on the memory allocator 116 to select a device based, for example, on the relative loads of each device.

In some embodiments, the memory allocator 116 may implement a separate buddy memory allocation scheme for each of the storage devices SD 1, SD 2, . . . , SD n. Thus, after a device 104 has been selected (e.g., by the memory allocator 116 or by the process that issued the request 118), one or more pages 120 may be allocated from the selected device 104 based on the number of requested pages (e.g., the level or order of the request) but without awareness of which of the one or more channels 110 the memory is allocated from.

In some embodiments, the memory allocator 116 may select one of the media cores 108 from which to allocate the memory 120 for the request 118 (e.g., the media cores 108 may be statically mapped), but without awareness of which of the one or more channels 110 associated with the selected media core 108 the memory 120 is allocated from. For example, the selected media core 108 may dynamically map the one or more allocated memory pages 120 to one or more of its channels (e.g., Ch1, Ch2, . . . , Chn) using a logical block address to physical block address (LBA-to-PBA or LBA2PBA) mapping scheme. (If a storage device 104 is implemented as a flash based SSD with flash cores, an LBA-to-PBA mapping scheme may be implemented, for example, by a flash translation layer (FTL) in one or more of the flash cores.)

Thus, the host 102 may be unaware of which of the one or more channels 110 the requested memory 120 has been allocated from. Moreover, the pages may be allocated in a manner that may result in an uneven distribution of allocated pages as shown in FIG. 1. Allocated pages and/or blocks are indicated with shading, an example of which is indicated as 122. Unallocated pages and/or blocks are indicated without shading, an example of which is indicated as 124.

Referring to SD n of FIG. 1, the memory channels 110 are illustrated as bar graphs with the shaded portion indicating a percent of the channel memory that is allocated. The resulting overall memory allocation of each media core 108 is provided as a percentage.

In some embodiments, and depending on the implementation details, an uneven distribution of pages and/or blocks as shown in SD 1 and SD n in FIG. 1 may degrade the overall performance of the system, for example, by reducing bandwidth utilization and/or channel parallelism. Referring to Media Core 0 of SD 1 as an example, Ch2 may have significantly more allocated pages than Ch1. Thus, if a first process attempts to access (e.g., read/and or write) one of the pages in Ch1, there may be a relatively high probability that a second process is already accessing (e.g., reading and/or writing) another page in Ch2. The first process may, therefore, wait until the access by the second process is completed before the first process may proceed with its access. Also, because Ch2 may be used more intensively, Ch2 may enter garbage collection earlier and/or more often than Ch1. This may result in a tail latency for the first process and/or reduce bandwidth utilization and/or channel parallelism.

In some embodiments, to implement static mapping of multiple media cores 108 within a device 104, the memory allocator 116 may provide the device 104 with an address in which one or more bits may specify a media core 108. Thus, in a device 104 with four media cores 108, two bits of an address may determine the media core 108. In such an embodiment, the memory allocator may not provide any address bits for the channel because the selected media core 108 may dynamically map the one or more allocated memory pages 120 to one or more of its channels (e.g., Ch1, Ch2, . . . , Chn) using an LBA-to-PBA mapping scheme.

Figure 2A:
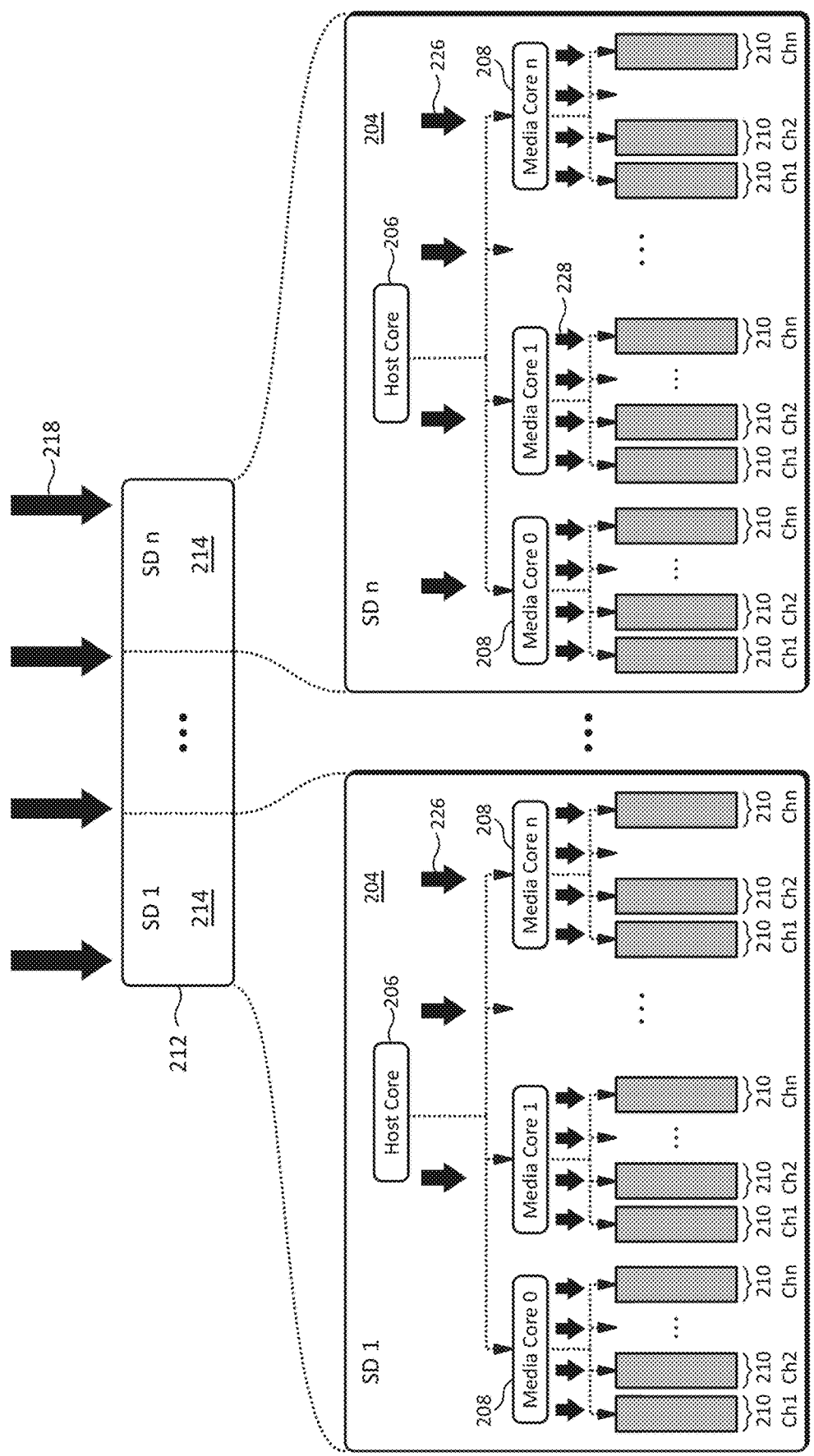
FIG. 2A illustrates an embodiment of a utilization aware memory allocation scheme in accordance with example embodiments of the disclosure.

FIG. 2A illustrates an embodiment of a utilization aware memory allocation scheme in accordance with example embodiments of the disclosure. In the embodiment illustrated in FIG. 2A, one or more storage devices 204 may be configured (e.g., mapped) as one or more corresponding regions 214 of device attached memory 212. Each of the storage devices 204 may include one or more media cores 208 (indicated as Media Core 0, Media Core 1, . . . , Media Core n), each of which may have one or more memory channels 210 (indicated as Ch1, Ch2, . . . , Chn).

Memory allocation requests 218 may be serviced in a manner that may spread (e.g., evenly distribute) memory allocations across the devices 204, the media cores 208, and/or the channels 210 based, for example, on the relative utilization (e.g., percent of memory allocated) of the devices 204, media cores 208 and/or channels 210. In some embodiments, the memory allocation requests 218 may be serviced by device selection logic, channel selection logic, and/or page allocation logic that may be located, for example, at one or more hosts.

In some embodiments, spreading memory allocations across the storage devices 204, media cores 208, and/or channels 210 may result in more evenly distributed traffic (e.g., read and/or write operations) for the allocated pages as shown by media core traffic 226 and/or channel traffic 228. Depending on the implementation details, this may reduce tail latency and/or increase bandwidth utilization and/or channel parallelism.

Figure 2B:
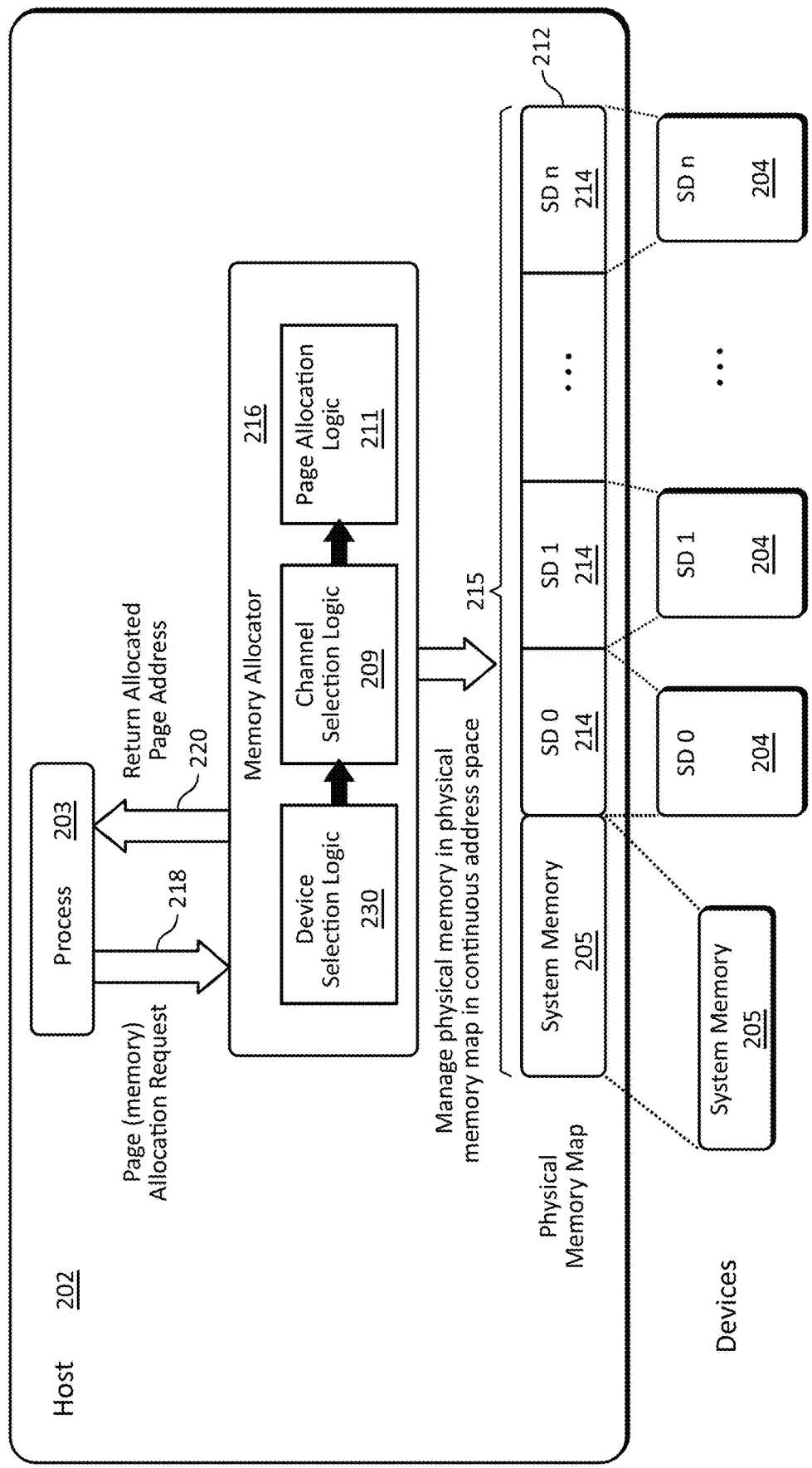
FIG. 2B illustrates an embodiment of a utilization aware memory allocation scheme having a memory allocator in accordance with example embodiments of the disclosure.

FIG. 2B illustrates an embodiment of a utilization aware memory allocation scheme having a memory allocator in accordance with example embodiments of the disclosure. The system illustrated in FIG. 2B may include a host 202, a system memory 205, and one or more storage devices 204 indicated as SD 0, . . . , SD n. The one or more storage devices 204 may be configured (e.g., mapped) as one or more corresponding regions 214 of device attached memory 212. The system memory 205 (e.g., a host memory which may be implemented with dynamic random access memory (DRAM)) and device attached memory 212 may be arranged in a physical memory map 215. In some embodiments, the regions 214 of the device attached memory 212 may be placed into logically contiguous memory areas of the physical memory map 215.

The host 202 may include a memory allocator 216 that may manage some or all of the physical memory map 215. The memory allocator 216 may receive memory allocation requests 218 from one or more processes 203 such as programs, applications, services, kernels, and/or the like, and service the requests 218 by allocating one or more pages of memory 220 to the process that sent the request 218. The memory allocator 216 may include device selection logic 230, channel selection logic 209, and/or page allocation logic 211 that may spread (e.g., evenly distribute) memory allocations across that storage devices 204 and/or one or more channels within the storage the devices 204.

In some embodiments, in response to a memory allocation request 218, the device selection logic 230 may select one of the devices 204 from which to allocate the requested memory 220 based on the relative utilization of each device. For example, the device selection logic 230 may select one of the devices 204 based on a relative percentage utilization of each of the devices 204 (e.g., the requested memory may be allocated from the device 204 having the lowest percentage utilization).

After the device selection logic 230 selects one of the devices 204, the channel selection logic may select one or more channels within the selected device 204 from which to allocate the requested memory 220. For example, the channel selection logic 209 may select a channel based on a balanced random policy, a least used channel policy, and/or the like.

After the channel selection logic 209 selects one or more channels within the selected device 204, the page allocation logic 211 may allocate one or more pages of memory 220 from the one or more selected channels. For example, the channel selection logic 211 may search for, and allocate, n contiguous memory pages, where n is the number of requested pages (e.g., the level or order of the request), but only in the one or more channels selected by the channel selection logic 209.

Figure 3:
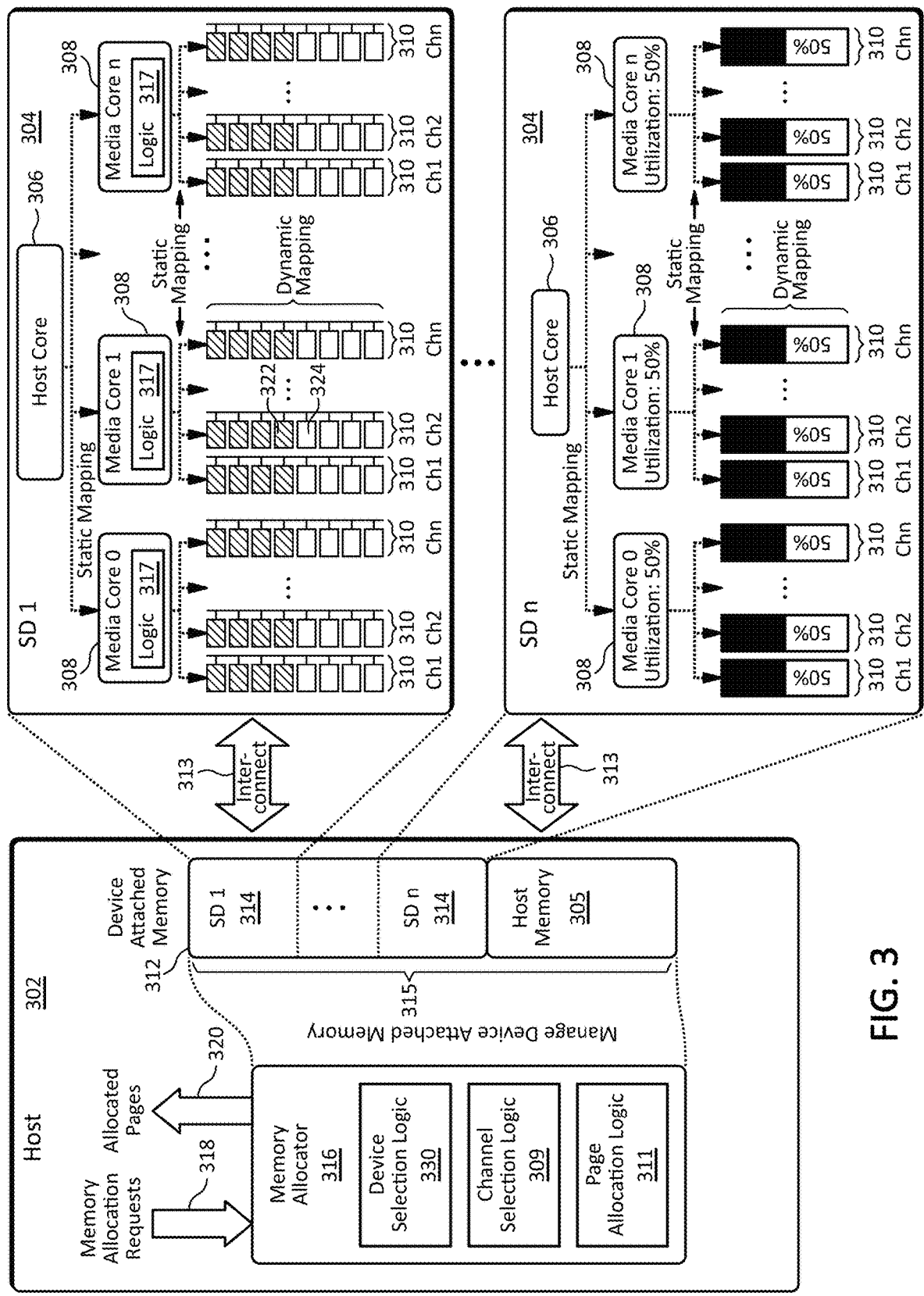
FIG. 3 illustrates an example embodiment of a utilization aware memory allocation scheme in accordance with example embodiments of the disclosure.

FIG. 3 illustrates an example embodiment of a utilization aware memory allocation scheme in accordance with example embodiments of the disclosure. The system illustrated in FIG. 3 may include a host 302 and one or more storage devices (SDs) 304 which may be indicated as SD 1, . . . , SD n. The host 302 may include a memory allocator 316 that may receive memory allocation requests 318 from processes such as programs, applications, services, kernels, and/or the like, and service the requests 318 by allocating one or more pages of memory 320 to the process that sent the request 318.

Some or all of the storage media of the storage devices 304 may be configured as device attached memory 312 that may be accessible to the host 302 (e.g., using a virtual addressing scheme). The device attached memory 312 may include regions 314 corresponding to the storage devices SD 1, SD 2, . . . , SD n, respectively. In some embodiments, the device attached memory 312 may be arranged in a physical memory map 315 that may include a system memory (e.g., a host memory) 305.

The host 302 may access the storage devices 304 through an interconnect 313 which, in some embodiments, may be implemented with a memory semantic and/or memory coherent interconnect such as Compute Express Link (CXL), and/or using a memory coherent protocol such as CXL.mem. However, embodiments may also be implemented with any other interfaces and/or protocols.

One or more of the storage devices 304 may include a host core 306 and one or more media cores 308. Each of the media cores 308 may control access to one or more memory channels 310, each of which may include pages of memory arranged, for example, in blocks. In this example, the media cores 308 may be indicated as Media Core 0, Media Core 1, . . . , Media Core n, and the memory channels 310 may be designated as Ch1, Ch2, . . . , Chn. In some embodiments, the media cores 308 may be implemented as flash cores, and the channels 310 may be implemented with flash memory, but any other types of storage media and/or media cores may be used.

The memory allocator 316 may include device selection logic 330, channel selection logic 309, and/or page allocation logic 311 that may distribute allocated memory pages 320 to the one or more storage devices 304, media cores 308, and/or memory channels 310, in a manner that may spread (e.g., evenly distribute) the allocated memory pages 320 across the memory channels 310.

In some embodiments, in response to a memory allocation request 318, the device selection logic 330 may select one of multiple storage devices 304 based on the relative utilization (e.g., percent allocated memory) of each storage device 304. In some embodiments, the process that issued the memory allocation request 318 may select the storage device 304.

After a device 304 has been selected for a memory allocation request 318 (e.g., by the memory allocator 316 or by the process that issued the request 318), the channel selection logic 309 may select a channel 310 within the selected device 304 based on the relative utilization of each channel 310. For example, the channel selection logic 309 may select a channel based on a balanced random policy, a least used channel policy, and/or the like.

Because one or more of the devices 304 may have multiple media cores 308, selecting a channel 310 may also involve selecting a media core 308. Thus, in some embodiments, a memory allocator 316 may provide a memory device 304 with an address in which one or more bits may specify a selected media core 308 and one or more bits may specify a selected memory channel 310. For example, in a device 304 having four media cores 308, each of which has eight memory channels 310, an address may include five bits to specify the selected memory channel 310—two bits to specify the media core 308, and three bits to specify the memory channel 310 within the media core 308.

Thus, in some embodiments, both the media cores 308 and the memory channels 310 may be statically mapped as shown in FIG. 3 because the selected media core 308 and/or memory channel 310 may be determined by the channel selection logic 309.

In some embodiments, a host memory management scheme may include a host-side memory map that may include a base address and/or memory size of regions 314 corresponding to the storage devices SD 1, SD 2, . . . , SD n. For example, in an embodiment in which the one or more storage devices 304 each have a capacity of 16 GB, the host memory 305 may occupy an address range of zero to 1 GB, the region 314 associated with SD 1 may occupy a range of 1 GB to 17 GB, the region 314 associated with SD 2 may occupy a range of 17 GB to 33 GB, etc. Thus, a storage device number may not be included in an address provided by the memory allocator 316. In some other embodiments, however, an address may include one or more bits to specify a device 304.

After the channel selection logic 309 selects one or more channels within the selected device 304, the page allocation logic 311 may allocate one or more pages of memory 320 from the one or more selected channels 310. For example, the channel selection logic 311 may search for, and allocate, n contiguous memory pages, where n is the number of requested pages (e.g., the level or order of the request), but only in the one or more channels selected by the channel selection logic 309.

In some embodiments, one or more of the media cores 308 may include mapping logic 317 that may implement an LBA-to-PBA mapping scheme to dynamically allocated map pages within the one or more memory channels 310.

By spreading allocated memory pages 320 allocations across devices 304, media cores 308, and/or memory channels 310, the embodiment illustrated in FIG. 3 may provide a more even distribution of allocated memory pages as shown in FIG. 3. Allocated pages and/or blocks are indicated with shading, an example of which is indicated as 322. Unallocated pages and/or blocks are indicated without shading, an example of which is indicated as 324. A more even distribution of allocated memory may also be apparent with reference to SD n in FIG. 3 where the memory channels 310 are illustrated as bar graphs with the shaded portion indicating a percent of the channel memory that is allocated. The resulting overall memory allocation of each media core 308 is provided as a percentage.

Depending on the implementation details, this relatively even distribution of allocated memory pages may provide a more even distribution of memory input and/or output operations (I/Os), which in turn, may reduce tail latency, increase bandwidth utilization, and/or increase channel parallelism.

For purposes of illustration, FIG. 3 may provide a logical view of the allocated pages and/or blocks within each of the memory channels 310. Thus, the allocated pages and/or blocks may be illustrated in contiguous locations. However, based on an LBA-to-PBA mapping scheme within each channel 310, the allocated pages and/or blocks within each of the memory channels 310 may be distributed throughout the memory channel in any manner while still maintaining balance (e.g., an even distribution) across the memory channels 310.

For purposes of illustration, the device selection logic 330, channel selection logic 309, and/or page allocation logic 311 may be illustrated and/or described as being located at the host 302. However, other embodiments, some or all of this logic may be implemented in any location. For example, some or all of the logic may be located at the host 302, one or more of the host cores 306, one or more of the media cores 308, or any other location in one or more of the storage devices 304, or distributed in any combination thereof.

Figure 4A:
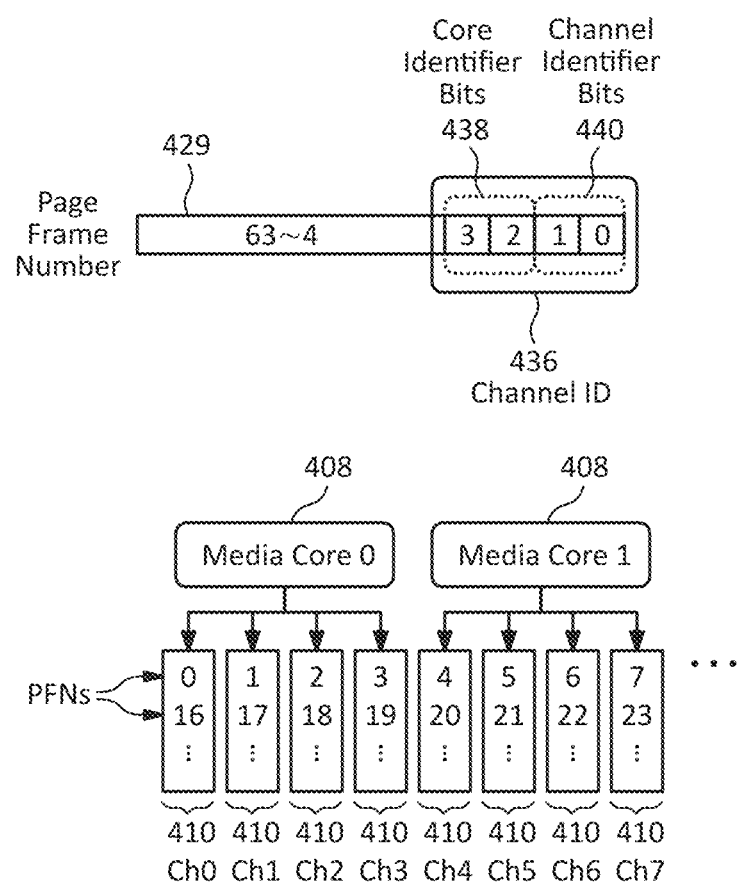
FIG. 4A illustrates an example embodiment of a fully interleaved page frame numbering scheme in accordance with example embodiments of the disclosure.

FIG. 4A illustrates an example embodiment of a fully interleaved page frame numbering scheme in accordance with example embodiments of the disclosure. In the page frame number (PFN) illustrated in FIG. 4A, a 64-bit address 429 may include a 4-bit channel identifier portion 436 (which may also be referred to as a channel ID, CH ID, or Ch ID).

The channel ID 436 may include two core identifier bits 438 (which may also be referred to as core ID bits, Mcore ID bits (for a media core), and/or Fcore ID bits (for a flash core)). The two core ID bits may identify a specific media core 408 to which the page is mapped.

The channel ID 436 may also include two channel identifier bits 440 (which may also be referred to as channel ID bits, Ch ID bits, or CH ID bits) that may identify a specific channel to which the page is mapped.

The 4-bit channel identifier portion 436 may be located at the four lowest bits of the PFN to implement a fully interleaved memory mapping as shown by the media cores 408 and channels 410 having a PFN arrangement as illustrated in FIG. 4A.

Figure 4B:
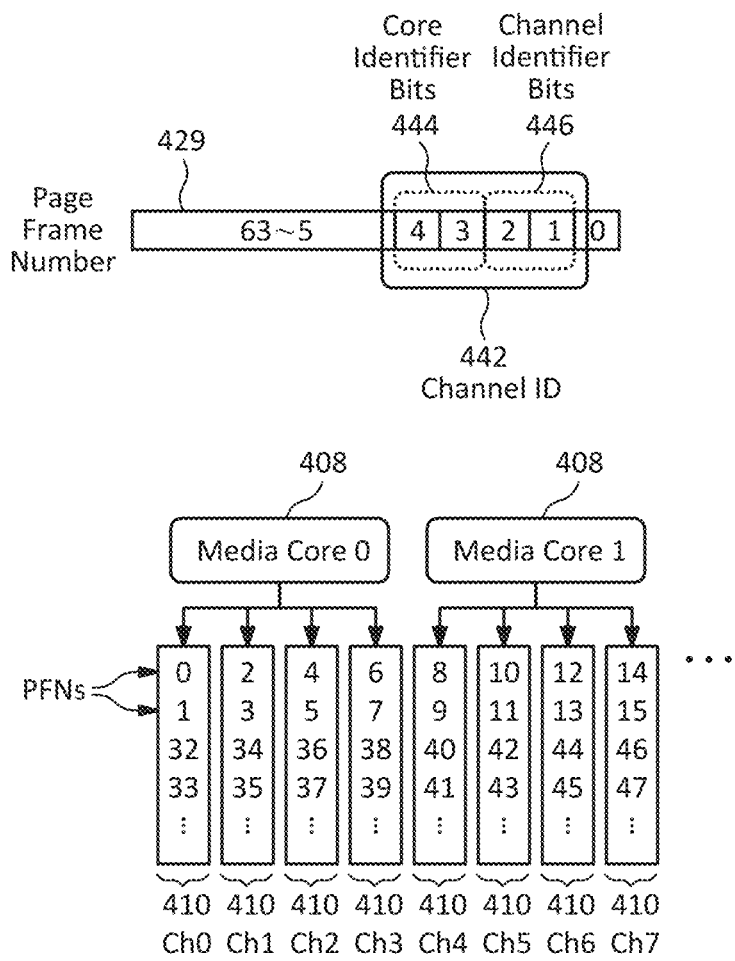
FIG. 4B illustrates an example embodiment of a page frame numbering scheme having multiple consecutive pages belonging to the same channel in accordance with example embodiments of the disclosure.

FIG. 4B illustrates an example embodiment of a page frame numbering scheme having multiple consecutive pages belonging to the same channel in accordance with example embodiments of the disclosure. The embodiment illustrated in FIG. 4B may be similar to that illustrated in FIG. 4A, but it may have a channel ID 442 that is aligned with bits 1 through 4 of the PFN to implement a memory mapping in which two consecutive pages of memory may belong to the same channel as shown by the media cores 408 and channels 410 having a PFN arrangement as illustrated in FIG. 4B. The two core identifier bits 444 may align with bits 3 and 4 of the PFN, and the two channel identifier bits 446 may align with bits 1 and 2 of the PFN. Thus, adjacent pages may belong to different channels due to channel interleaving.

Figure 4C:
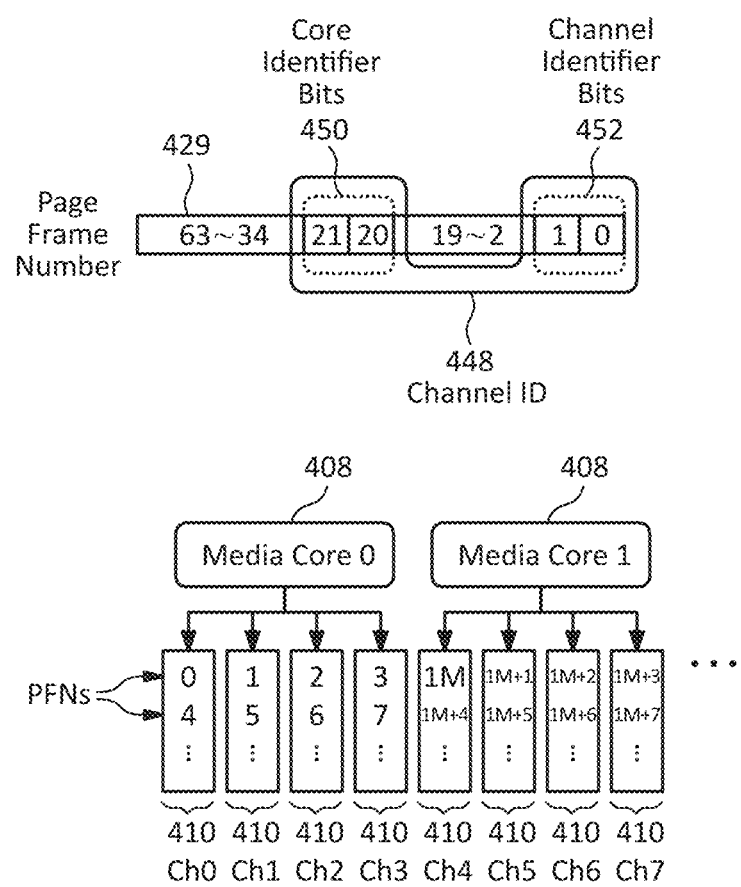
FIG. 4C illustrates an example embodiment of a page frame numbering scheme having non-interleaved mapping in accordance with example embodiments of the disclosure.

FIG. 4C illustrates an example embodiment of a page frame numbering scheme having non-interleaved mapping in accordance with example embodiments of the disclosure. The embodiment illustrated in FIG. 4C may be similar to those illustrated in FIGS. 4A and 4B, but it may have a channel ID 448 with core identifier bits 450 and channel identifier bits 452 that may be split between different regions of the PFN 429 to implement a non-interleaved mapping as shown by the media cores 408 and channels 410 having a PFN arrangement as illustrated in FIG. 4C.

The embodiments illustrated in FIG. 4A, FIG. 4B, and/or FIG. 4C may be used to, for example, implement a static mapping of a page of memory to a memory channel and/or media core and/or dynamic mapping of a page of memory within a memory channel in any of the embodiments of utilization aware memory allocation schemes disclosed herein. Although the embodiments illustrated in FIG. 4A, FIG. 4B, and/or FIG. 4C may be illustrated with specific numbers of core ID bits, channel ID bits, and/or the like, in specific bit locations, any numbers of bits and/or bit locations may be used to implement any type of memory mapping.

Figure 5:
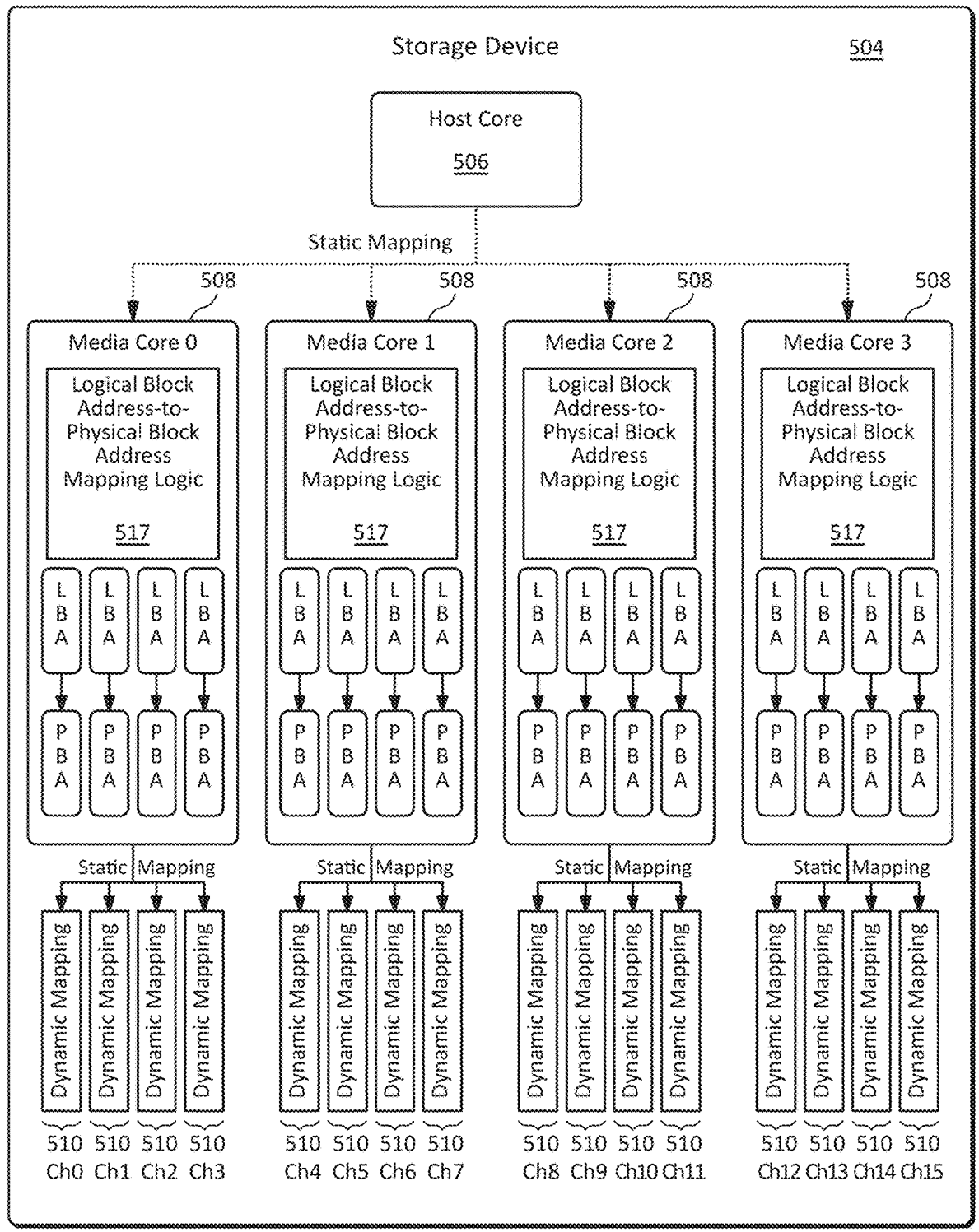
FIG. 5 illustrates an example embodiment of a storage device architecture in accordance with example embodiments of the disclosure.

FIG. 5 illustrates an example embodiment of a storage device architecture in accordance with example embodiments of the disclosure. The embodiment illustrated in FIG. 5 may be used to implement any of the utilization aware memory allocation schemes disclosed herein. For example, it may be used to implement any of the storage devices 204 illustrated in FIG. 2 and/or storage devices 304 illustrated in FIG. 3.

Referring to FIG. 5, the storage device 504 may include a host core 506 and one or more media cores 508 indicated as Media Core 0, Media Core 1, ..., Media Core 3. One or more of the media cores 508 may control access to one or more memory channels 510 indicated as Ch1, Ch2, ..., Ch15.

The host core 506 may communicate with a host, for example, through any type of interconnect, for example, a memory coherent interconnect such as CXL and/or using any type of protocol, for example, a coherent protocol such as CXL.mem.

One or more of the media cores 508 may include LBA-to-PBA mapping logic 517 that may dynamically map logical block address of allocated memory pages to physical block addresses within memory channels 510.

In some embodiments, the media cores 508 and/or the memory channels 510 may be statically mapped as shown in FIG. 5, for example, because channel selection logic located in a host may provide the storage device 504 with an address for one or more allocated memory pages that may include one or more bits for a selected media core 508 and/or memory channel 510. In the example embodiment illustrated in FIG. 5, the storage device 504 may include four media cores 508, each of which may have four memory channels 510. Thus, an address provided by a memory allocator may include four bits to specify a selected memory channel-two bits to specify the media core 508 and two bits to specify the memory channel 510.

In some embodiments, the media cores 508 may be implemented as flash cores, and the channels 510 may be implemented with flash memory, but any other types of storage media and/or media cores may be used. For purposes of illustration, the storage device 504 illustrated in FIG. 5 may be implemented with four media cores 508, each of which may have four memory channels 510, however, any number of media cores 508 and/or memory channels 510 may be used.

Figure 6:
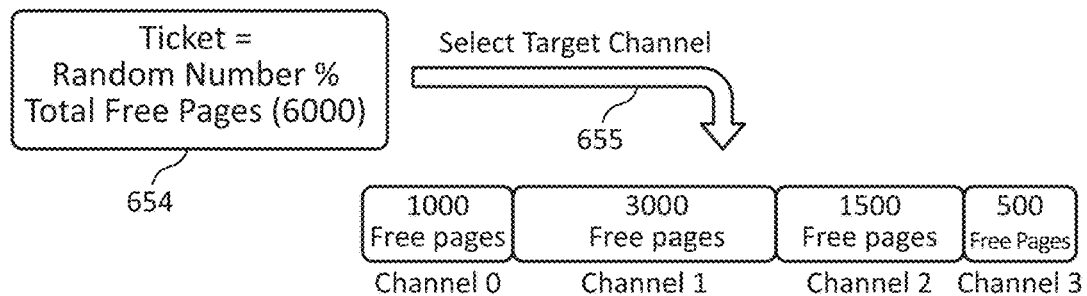
FIG. 6 illustrates an example embodiment of a balanced random channel selection method in accordance with example embodiments of the disclosure.

FIG. 6 illustrates an example embodiment of a balanced random channel selection method in accordance with example embodiments of the disclosure. The embodiment illustrated in FIG. 6 may be used, for example, to implement any of the channel selection logic disclosed herein. In the embodiment illustrated in FIG. 6, there may be four memory channels Channel 0, Channel 1, Channel 2, and Channel 3, however, in other embodiments, any number of channels may be used. At the beginning of the method, Channels 0, 1, 2, and 3 may have 1000, 3000, 1500, and 500 free pages, respectively. Thus, there may be a total of 6000 free pages. To select a channel from which to allocate a page of memory, the method may create a ticket 654 by generating a random number (e.g., a random number between zero and the total number of free pages), and calculating the random number modulo (%) the total number of free pages. In this example, the ticket=random number % 6000. The ticket may then be used to select a channel (which may be referred to as a target channel) as shown by arrow 655 from which to allocate a memory page using a balanced random policy such as that illustrated in FIG. 7.

Figure 7:
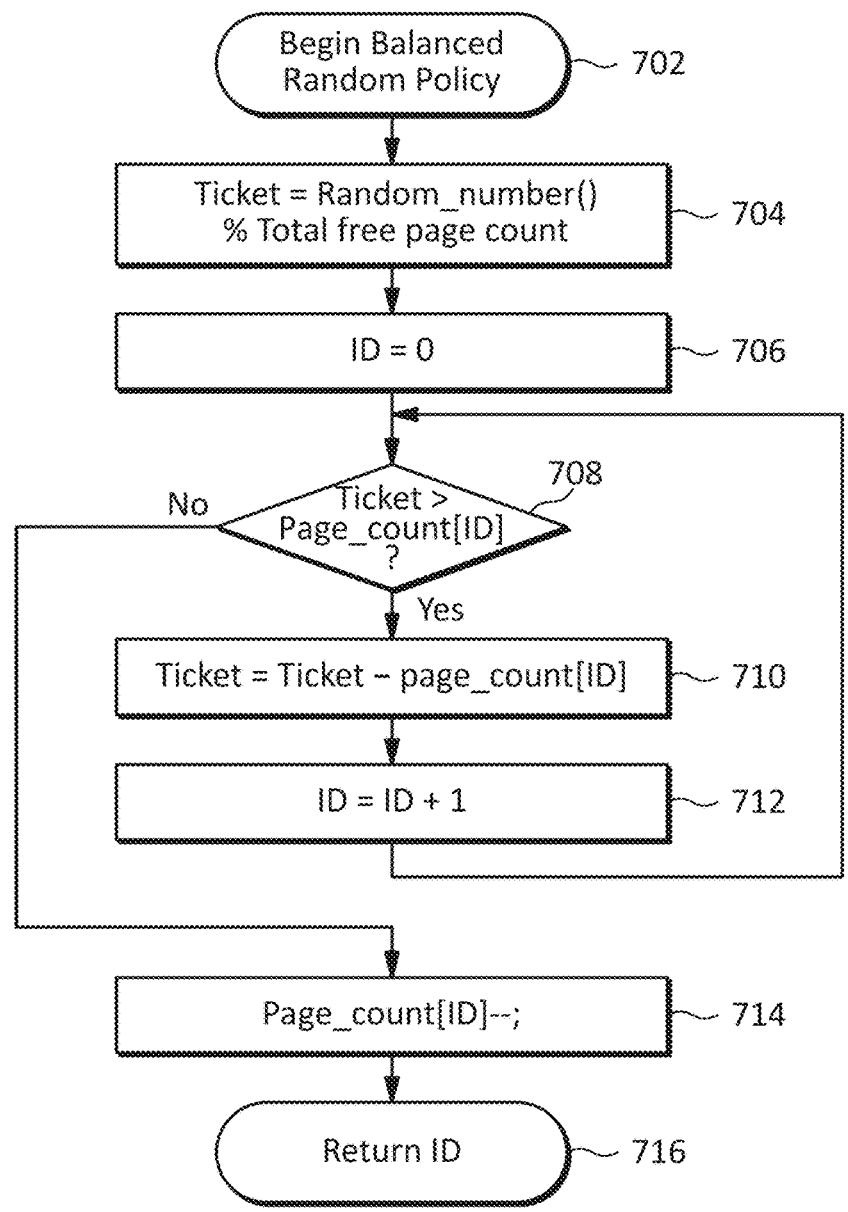
FIG. 7 illustrates an example embodiment of a method for implementing a balanced random channel selection policy in accordance with example embodiments of the disclosure.

FIG. 7 illustrates an example embodiment of a method for implementing a balanced random channel selection policy in accordance with example embodiments of the disclosure. The embodiment illustrated in FIG. 7 may be used, for example, to implement any of the channel selection logic disclosed herein.

The method may begin at operation 702. At operation 704, the value of a ticket (Ticket) may be initialized by calculating a random number modulo the total number of free pages across all channels. At operation 706, a channel identifier (ID) may be initialized to zero. At operation 708, the method may compare the value of the ticket to the number of free pages in Channel 0 (Page_count[ID] where ID=0). If the value of the ticket is greater than the number of free pages in Channel 0, the method may proceed to operation 710 wherein the number of free pages in Channel 0 may be subtracted from the value of the ticket. At operation 712, the method may increment the channel identifier (ID) to move to the next channel. The method may then return to operation 708 and loop through operations 710 and 712 until the value of the ticket is less than or equal to the number of free pages in the current channel as identified by the channel identifier (ID). If at operation 708, the value of the ticket is less than or equal to the number of free pages in the current channel, the method may proceed to operation 714 where the number of free pages in the channel indicated by the current channel identifier (ID) may be decremented by one. The method may then end at operation 716 by returning the channel identifier (ID) as the channel from which to allocate the next page of memory.

The method illustrated in FIG. 7 may be repeated each time a channel is selected from which to allocate one or more pages of memory.

Figure 8:
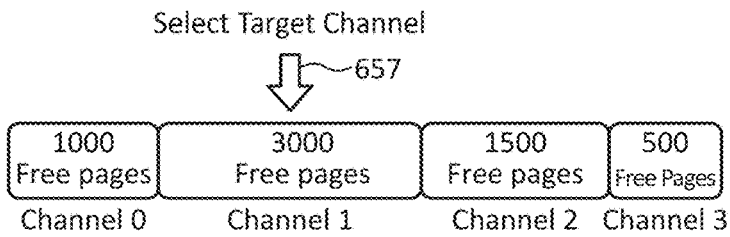
FIG. 8 illustrates an example embodiment of a least used channel first service channel selection method in accordance with example embodiments of the disclosure.

FIG. 8 illustrates an example embodiment of a least used channel first service channel selection method in accordance with example embodiments of the disclosure. The least used channel first service (LUCFS) policy illustrated in FIG. 8 may be used, for example, to implement any of the channel selection logic disclosed herein. In the embodiment illustrated in FIG. 8, there may be four memory channels Channel 0, Channel 1, Channel 2, and Channel 3, however, in other embodiments, any number of channels may be used. At the beginning of the method, Channels 0, 1, 2, and 3 may have 1000, 3000, 1500, and 500 free pages, respectively. Thus, there may be a total of 6000 free pages. The method illustrated in FIG. 8 may select the least used channel, e.g., the channel having the highest number of free pages as shown by arrow 657 using a LUCFS policy such as that illustrated in FIG. 9.

Figure 9:
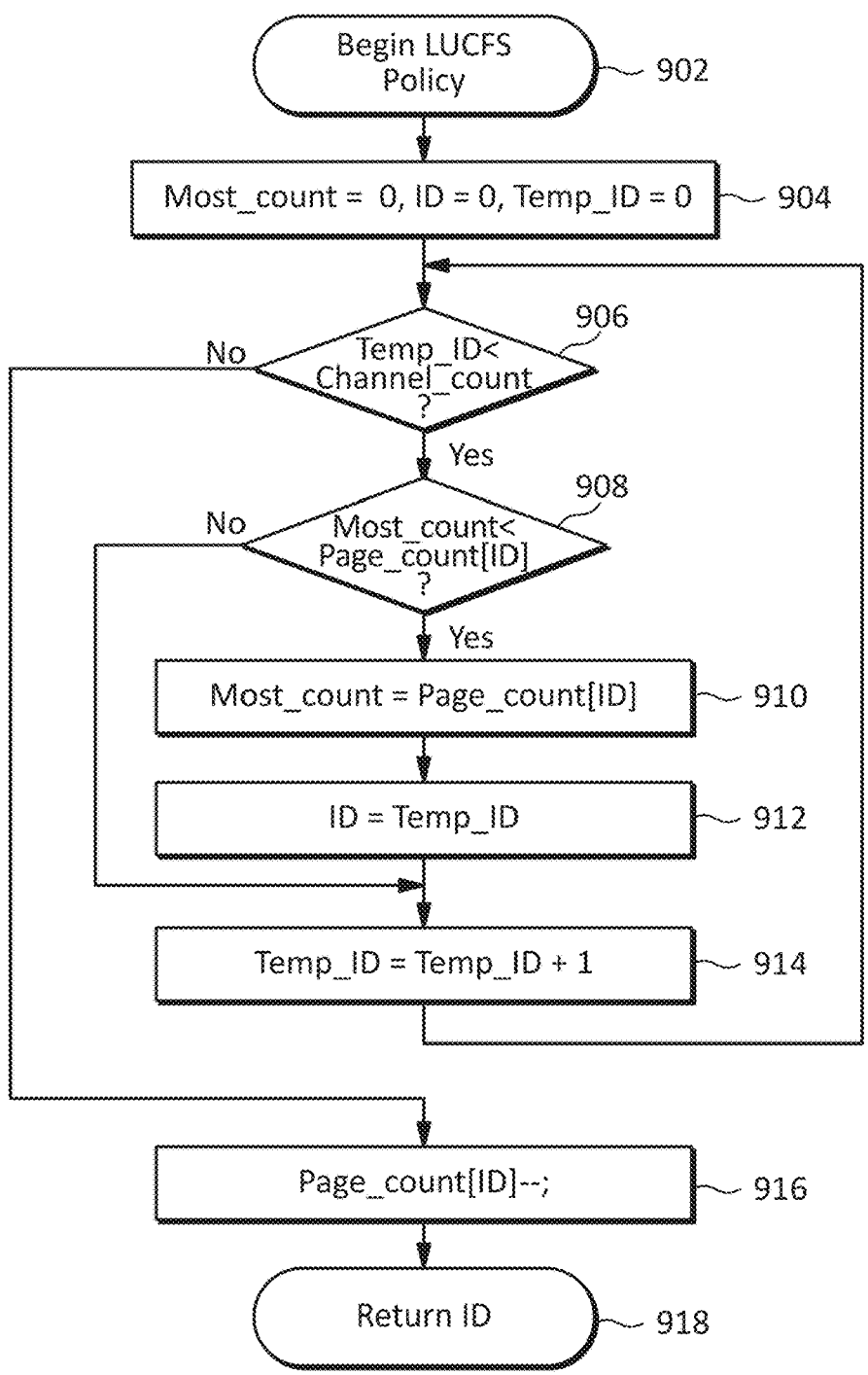
FIG. 9 illustrates an example embodiment of a method for implementing a least used channel first service channel selection policy in accordance with example embodiments of the disclosure.

FIG. 9 illustrates an example embodiment of a method for implementing a least used channel first service channel selection policy in accordance with example embodiments of the disclosure. The embodiment illustrated in FIG. 9 may be used, for example, to implement any of the channel selection logic disclosed herein.

The method may begin at operation 902. At operation 904, the method may initialize the variables Most_count, ID, and Temp_ID to zero. At operation 906, the method may compare Temp_ID to Channel_count which may indicate the total number of channels. If Temp_ID is less than Channel_count, the method may proceed to operation 908 where it may compare Most_count to Page_count[ID] which may indicate the number of free pages in the channel indicated by the channel identifier (ID). If Most_count is less than Page_count[ID], the method may proceed to operation 910 where Most_count may be set to the number of free pages in the current channel. At operation 912, the value of ID may be set to Temp_ID. The method may then proceed to operation 914.

If, however, at operation 908, Most_count is greater than or equal to the number of free pages in the current channel, the method may proceed to operation 914.

At operation 914, the value of Temp_ID may be incremented by one, and the method may return to operation 906. The method may continue looping through operations 908 and 914, and possibly operations 910 and 912, until the value of Temp_ID is greater than or equal to Channel_count at operation 906. The method may then proceed to operation 916 where the number of free pages in the channel indicated by the current channel identifier (ID) may be decremented by one. The method may then end at operation 918 by returning the channel identifier (ID) as the channel from which to allocate the next page of memory.

The method illustrated in FIG. 9 may be repeated each time a channel is selected from which to allocate one or more pages of memory.

Figures 10A, 10B:
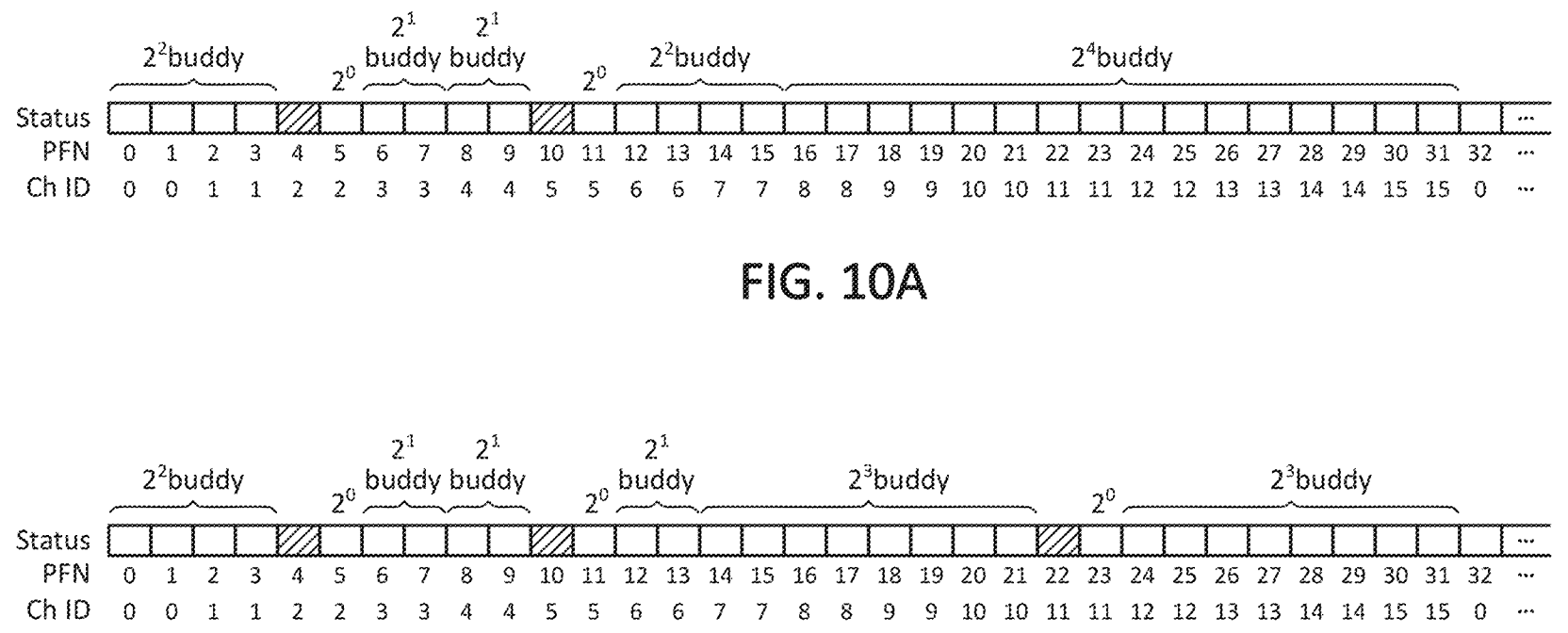

FIG. 10A illustrates an example embodiment of a page frame numbering scheme in accordance with example embodiments of the disclosure. The embodiment illustrated in FIG. 10A may be implemented, for example, using the scheme described above with respect to FIG. 4B in which two consecutive pages belong to the same channel. The embodiment illustrated in FIG. 10A may be used, for example, to implement the memory allocation schemes illustrated in FIG. 11 and FIG. 12.

Referring to FIG. 10A, the first 32 pages of consecutive memory, as indicated by corresponding PFNs, may be arranged in buddy groups having $2^0$ consecutive pages, $2^1$ consecutive pages, $2^2$ consecutive pages, $2^3$ consecutive pages, and $2^4$ consecutive pages. Allocated pages (in this example, PFN 4 and PFN 10) are indicated with shading. In the example illustrated in FIG. 10A, there are a total of sixteen memory channels (indicated by Ch ID 0 through Ch ID15), and two consecutive pages belong to each channel. Thus, the first 32 pages of memory (PFN 0 through PFN 15) are mapped in pairs to the sixteen memory channels. This pattern may continue with the next 32 pages of memory (PFN 32 through PFN 63) which may be mapped pairs to the sixteen memory channels.

Figure 11:
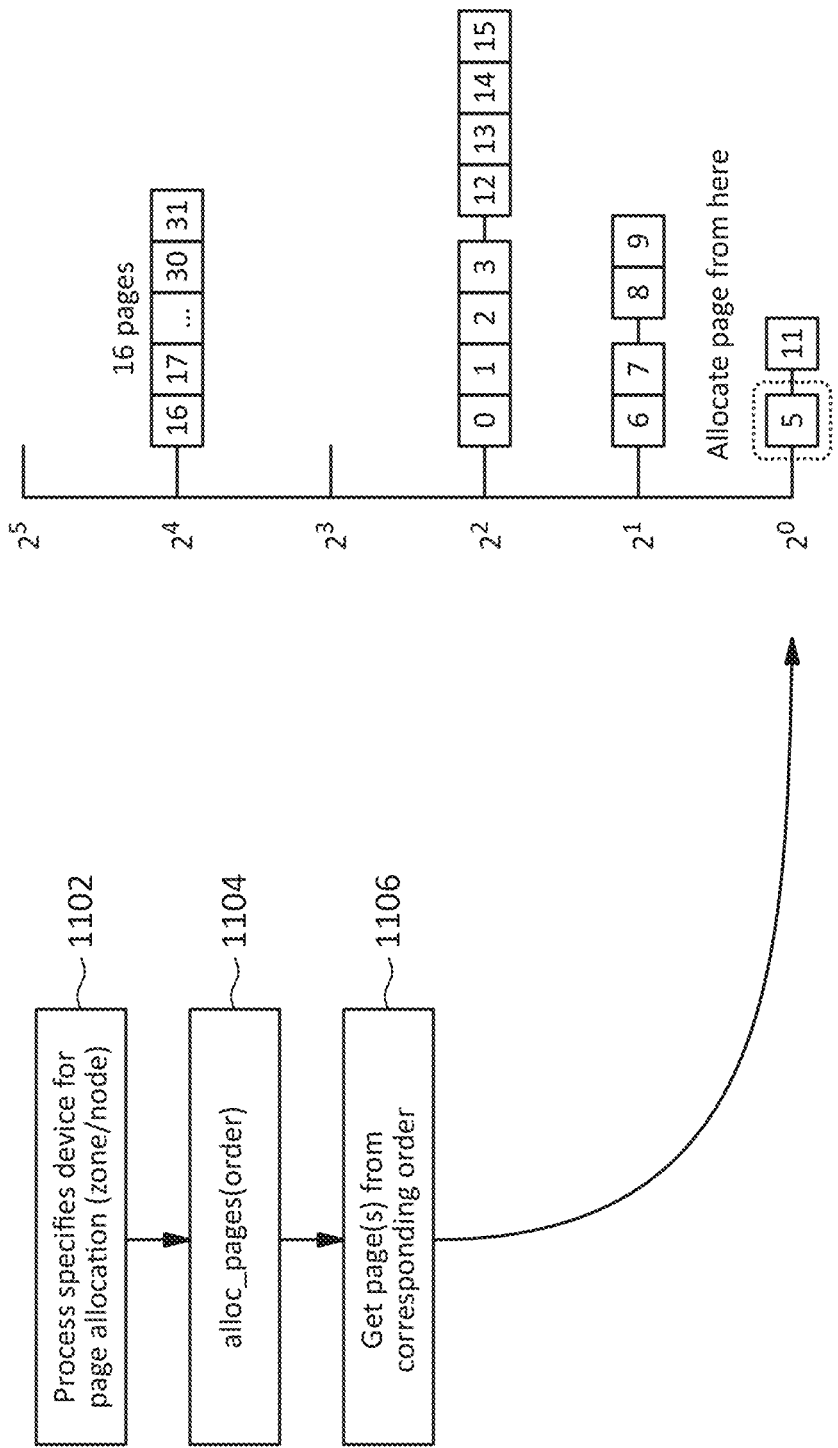
FIG. 11 illustrates an example embodiment of a buddy memory allocation scheme in accordance with example embodiments of the disclosure.

FIG. 11 illustrates an example embodiment of a buddy memory allocation scheme in accordance with example embodiments of the disclosure. The embodiment illustrated in FIG. 11 may be implemented, for example, using the embodiment illustrated in FIG. 1. In the embodiment illustrated in FIG. 11, there may be a total of sixteen memory channels, and the unallocated pages (e.g., the unallocated pages shown in FIG. 10A) may be arranged in a hierarchy of groups of free pages, where each order (level) of the hierarchy corresponds to a number of consecutive free pages. Thus, individual free pages 5 and 11 may be placed at order $2^0$ ($2^0$=1 consecutive free page), page groups 6~7 and 8~9 may be placed at order $2^1$ ($2^1$=2 consecutive free pages), page groups 0~3 and 12~15 may be placed at order $2^2$ ($2^2$=4 consecutive free pages), and page group 16~31 may be placed at order $2^4$ ($2^4$=16 consecutive free pages).

At operation 1102, the scheme illustrated in FIG. 11 may receive a memory allocation request for a single page from a process (which may also be referred to as a caller). The allocation request may specify a specific device (e.g., in a specific zone and/or at a specific node). At operation 1104, the scheme may invoke a memory allocation function alloc_pages(order) based on the order of the request (e.g., the number of pages requested). At operation 1106, the scheme may select a specific page to service the memory allocation request. Because the scheme illustrated in FIG. 11 may implement a buddy memory allocation scheme, it may attempt to allocate the requested number of pages from the lowest order of the hierarchy without regard to the channel to which the page or pages may belong. Thus, because the request received at operation 1104 is for a single page, the scheme illustrated in FIG. 11 may select page 5 from order (level) $2^0$. However, in response to a subsequent memory allocation request for a single page of memory, the scheme illustrated in FIG. 11 may select page 11 which may be located in the same memory channel as page 5. Thus, the scheme illustrated in FIG. 11 may result in an uneven distribution of allocated memory pages between memory channels.

Figure 12:
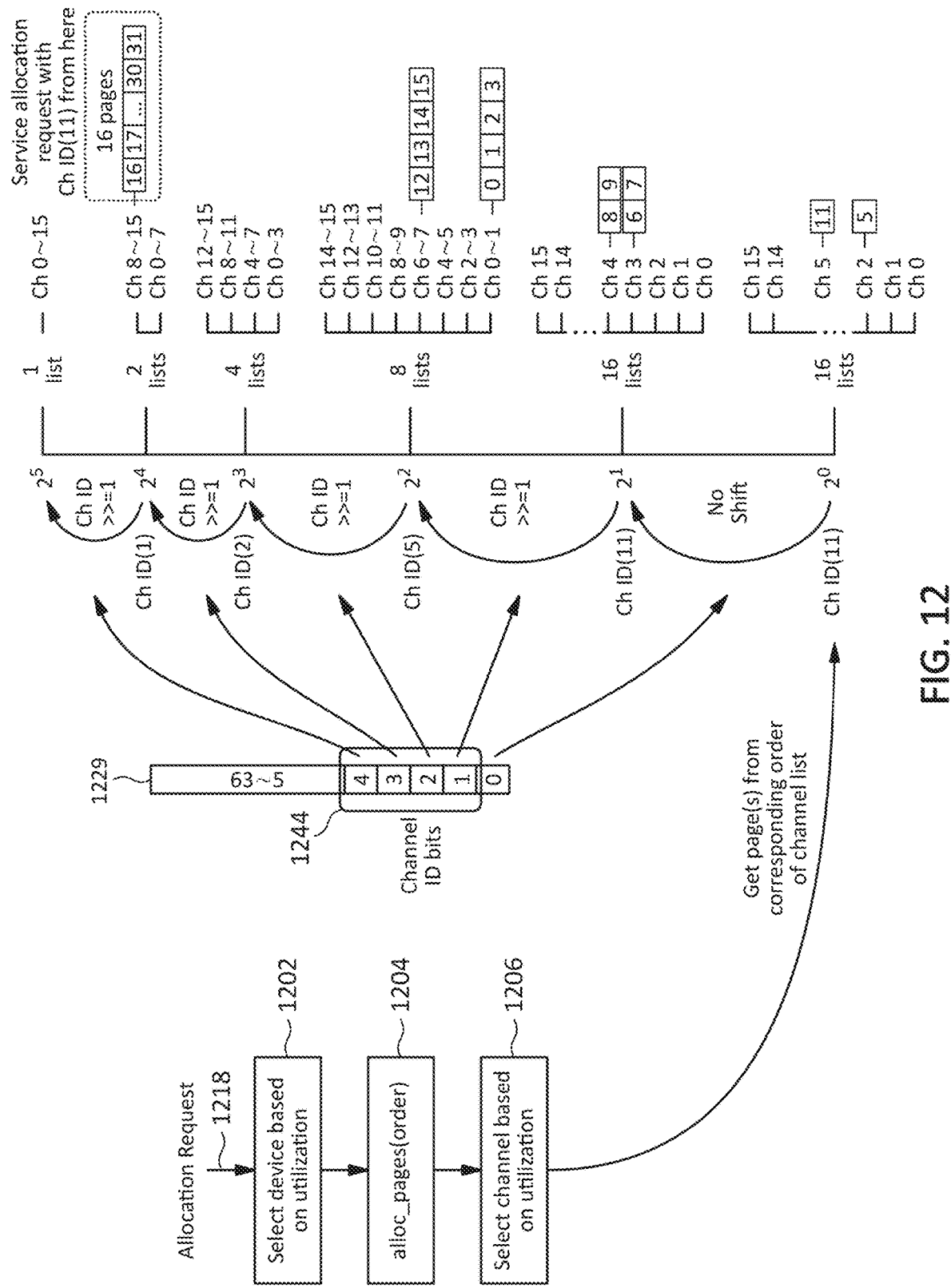
FIG. 12 illustrates an example embodiment of a utilization aware memory allocation scheme in accordance with example embodiments of the disclosure.

FIG. 12 illustrates an example embodiment of a utilization aware memory allocation scheme in accordance with example embodiments of the disclosure. The embodiment illustrated in FIG. 12 may be implemented, for example, using any of the embodiments illustrated in FIG. 2A, FIG. 2B, FIG. 3, FIG. 5, FIG. 6, FIG. 7, FIG. 8, and/or FIG. 9.

In the embodiment illustrated in FIG. 12, the unallocated pages (e.g., the unallocated pages shown in FIG. 10) may be arranged in lists based on the channel in which the pages are located. The lists, in turn, may be arranged in a hierarchy based on the number of consecutive free pages in each list. Thus, there may be sixteen lists at order (level) $2^0$, sixteen lists at order $2^1$, eight lists at order $2^2$, four lists at order $2^3$, two lists at order $2^4$, and one list at order $2^5$. The numbers in boxes to the right of the channel numbers indicate free pages in the corresponding channel that are arranged in groups having a number of consecutive free pages corresponding to the order at which the list is located.

Order $2^0$ and order $2^1$ may have the same number of lists because, in the dynamic mapping scheme, two pages may belong to each consecutive channel. Thus, the channel ID 1244 for the PFN 1229 of a requested page may align with bits 1 through 4 of the PFN.

At operation 1202, the scheme may receive an allocation request 1218 for one or more pages of device memory and select a storage device from which to allocate the requested memory based, for example, on the relative utilization of multiple storage devices. Operation 1202 may be performed, for example, by any of the device selection logic disclosed herein (e.g., device selection logic 230 illustrated in FIG. 2 and/or device selection logic 330 illustrated in FIG. 3.) In the example, embodiment illustrated in FIG. 12, the device selection logic may be assumed to have selected the storage device at which Ch 0 through Ch 15 are located.

At operation, 1204, the scheme may invoke a memory allocation function alloc_pages(order) based on the order of the request (e.g., the number of pages requested).

At operation 1206, the scheme may invoke channel selection logic to select a specific channel within the selected storage device from which to service the memory allocation request. Operation 1206 may be performed, for example, by any of the channel selection logic disclosed herein (e.g., channel selection logic 209 illustrated in FIG. 2 and/or channel selection logic 309 illustrated in FIG. 3.) For purposes of illustration, the request in this example embodiment may be for a single page of memory, and the channel selected by the channel selection operation may be Ch ID(11).

To select a page of memory to allocate, page allocation logic may begin at order $2^0$ and check the lists at order $2^0$ for a page of free memory in channel 11. For example, in some embodiments, the page allocation logic may use the channel ID as an index into a table of the lists or a list of the lists to take the logic directly to the list for the corresponding channel. Since no free page may be found for channel 11 at order $2^0$ (level 0), the page allocation logic may proceed to order $2^1$ (level 1) to look for a page of free memory in channel 11. Since no free page may be found for channel 11 at order $2^1$, the page allocation logic may continue to proceed up the hierarchy until it finds a free page in channel 11, or until it reaches the highest order ($2^5$ or level 5), in which case, the page allocation logic may return a failure indication rather than an allocated page.

By using the channel ID as an index to check a list for a free memory page, the index may be adapted for each order by shifting the index right by one bit. Thus, to check at order $2^2$, the Ch ID(11) may be shifted right one bit so it becomes Ch ID(5) which may be the correct index to use to check the lists for a free page in channel 11. Then Ch ID(5) may be right shifted to Ch ID(2), then Ch ID(1) to check the lists at order $2^3$ and $2^4$, respectively. At order $2^5$, there may only be one list to check, so no index may be needed. No shift may be needed between order $2^0$ and $2^1$ because the mapping scheme may map two consecutive pages belong to each channel.

In this example, the page allocation logic may locate sixteen consecutive free pages (PFN 16 through PFN 31) in channel 11 at order $2^4$. The page allocation logic may select one of the free pages associated with channel 11 (e.g., PFN 22 or PFN 23) and return the allocated page to the requesting process. The page allocation logic may then update the PFN mapping illustrated in FIG. 10A to reflect the status of the selected page as allocated as illustrated in FIG. 10B.

Thus, rather than selecting PFN 5 as in the embodiment illustrated in FIG. 11, the embodiment illustrated in FIG. 12 may select one of pages PFN 16 through PFN 31. Depending on the implementation details, this may provide a more even distribution of page allocations compared to the embodiment illustrated in FIG. 11 which may tend to keep allocating single pages from the bottom of the hierarchy which, in turn, may cause page allocations to become clustered in the channels in which those pages may be located.

As a further example, if at operation 1206 the channel selection logic selected channel 0 (Ch ID(0)) for allocating a single page of memory, the page allocation logic may begin looking for a free page at order $2^0$ (level 0). Because there are no free pages in the list for channel 0 at order $2^0$, the page allocation logic may proceed to order $2^1$ (level 1) to look for a page of free memory in channel 0. (No shift may be performed between level 0 and level 1.) Since no free page may be found for channel 0 at order $2^1$, the page allocation logic may continue to order $2^2$ (level 2). (Shifting zero as the index may simply result in zero.) At $2^2$, the page allocation logic may find pages 0 and 1 in the list for channel 0. Thus, the page allocation logic may allocate either of page 0 or page 1, then update the PFN mapping illustrated in FIG. 10 to reflect the status of the selected page as allocated. (PFN 2 and 3 in the list for Ch0~Ch1 are associated with channel 1.)

The page allocation operations illustrated in FIG. 12 may be implemented, for example, by any of the page allocation logic disclosed herein (e.g., page allocation logic 211 illustrated in FIG. 2 and/or page allocation logic 311 illustrated in FIG. 3.)

Figure 13A:
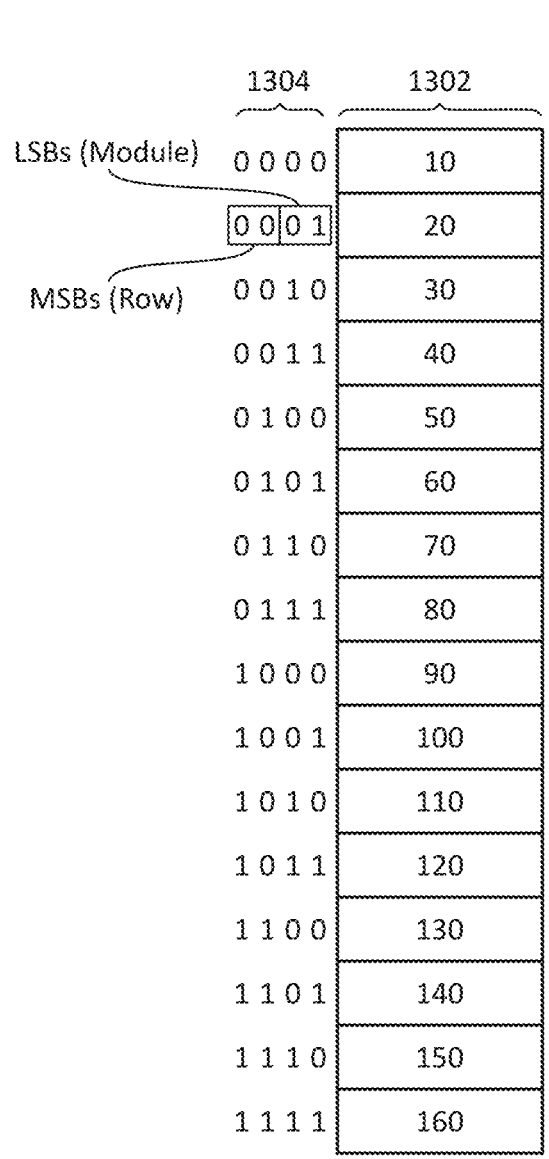
FIG. 13A illustrates an embodiment of an address interleaving scheme in accordance with example embodiments of the disclosure.

FIG. 13A illustrates an embodiment of an address interleaving scheme in accordance with example embodiments of the disclosure. The embodiment illustrated in FIG. 13A shows data 1302 at 4-bit memory addresses 1304 in a physical memory map. The two lower order bits (which may also be referred to as the least significant bits (LSBs) of each 4-bit address may provide the address of a module. The two higher order bits (which may also be referred to as the most significant bits (MSBs) of each 4-bit address may provide the address of a row within a module. For example, at 4-bit address 0001 (which contains the data "20"), the two lower order bits 01 indicate Module 01, and the two higher order bits 00 indicate row 00 within Module 01.

Figure 13B:
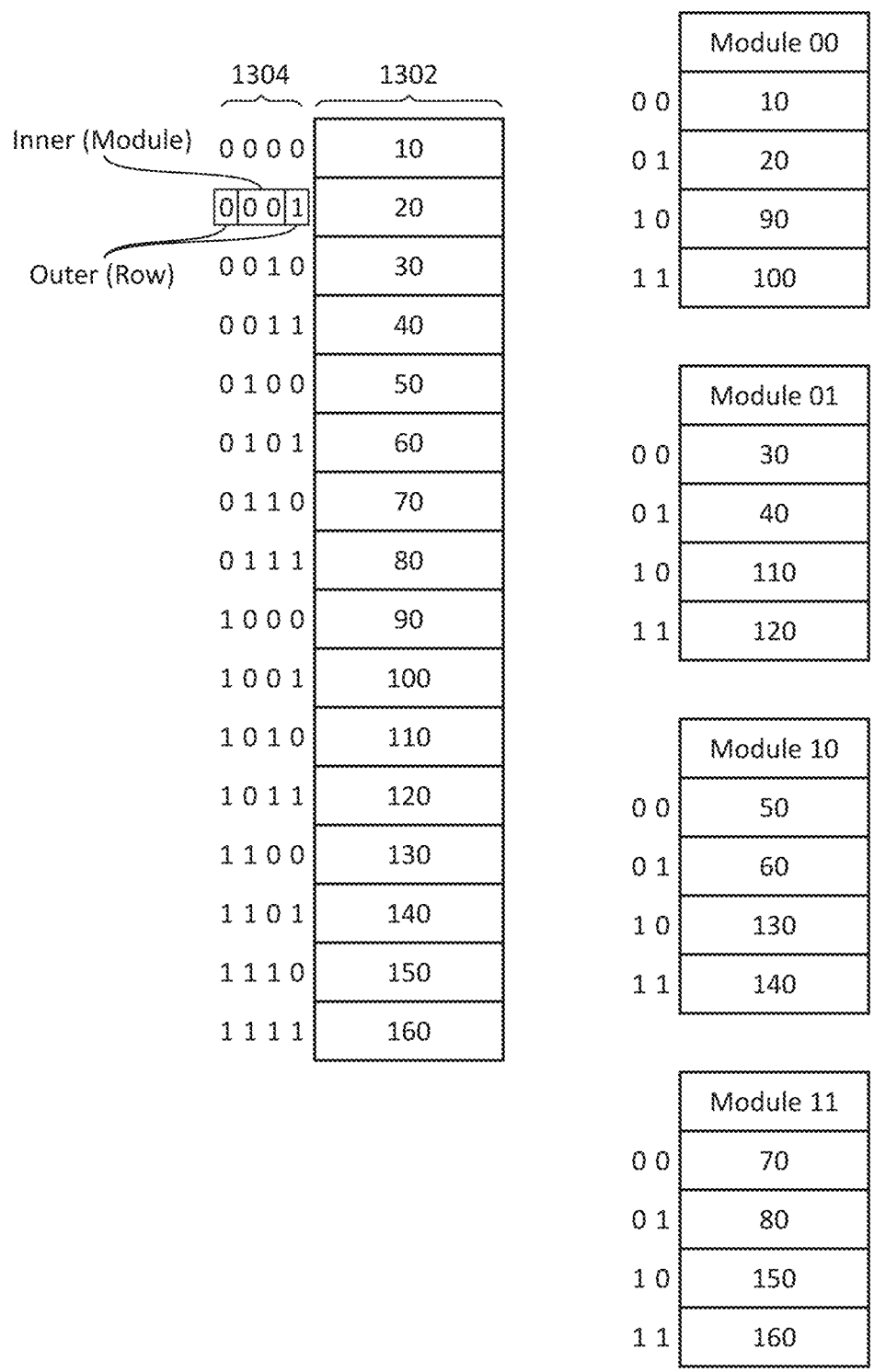
FIG. 13B illustrates another embodiment of an address interleaving scheme in accordance with example embodiments of the disclosure.

FIG. 13B illustrates another embodiment of an address interleaving scheme in accordance with example embodiments of the disclosure. The embodiment illustrated in FIG. 13B shows the same data 1302 at 4-bit memory addresses 1304 shown in FIG. 13. However, in the embodiment illustrated in FIG. 13B, the two inner bits (e.g., the second and third bits) of the 4-bit address provide the address of a module, and the two outer bits (e.g., the first and fourth bits) of the 4-bit address provide the address of a row within the module. For example, at 4-bit address 0001 (which contains the data "20"), the two inner bits 00 indicate Module 00, and the two outer bits 01 indicate row 01 within Module 00.

The embodiments of interleaving schemes illustrated in FIG. 13A and FIG. 13B may be used, for example, to implement interleaving in a memory system in accordance with example embodiments of the disclosure. For example, in some embodiments of a memory system, the address bits for the module may be used for a device (e.g., device bits), and the address bits for the row within the module may be used for a channel within the device (e.g., channel bits).

Figure 14A:
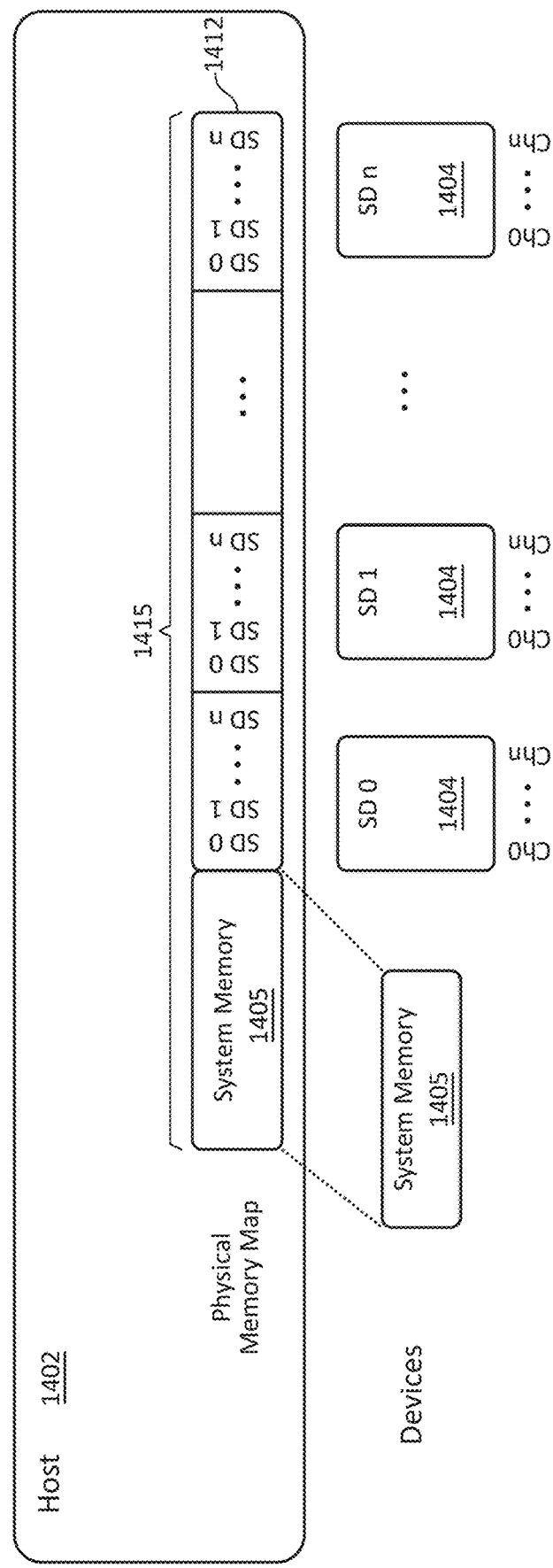
FIG. 14A illustrates an embodiment of an addressing scheme having device interleaving in accordance with example embodiments of the disclosure.

FIG. 14A illustrates an embodiment of a device interleaving scheme in accordance with example embodiments of the disclosure. The embodiment illustrated in FIG. 14A may include a host 1402, a system memory 1405, and one or more storage devices 1404 indicated as SD 0, . . . , SD n. The one or more storage devices 1404 may be mapped as device attached memory 1412 in a physical memory map 1415 that may include a system memory 1405 (e.g., a host memory that may be implemented with DRAM).

With device interleaving enabled as shown in FIG. 14A, consecutive pages of the physical memory map 1415 may belong to different storage devices 1404. (Pages indicated as SD 0, . . . , SD n in the physical memory map 1415 belong to storage devices SD 0, . . . , SD n, respectively.) This may be in contrast to the embodiment illustrated in FIG. 2B in which the individual devices 204 may be mapped to separate regions 214 of the device attached memory 212 in the physical memory map 215.

The scheme illustrated in FIG. 14A may be used, for example, with any of the memory allocators having device selection logic disclosed herein such as those illustrated in FIG. 2B and FIG. 3.

Figure 14B:
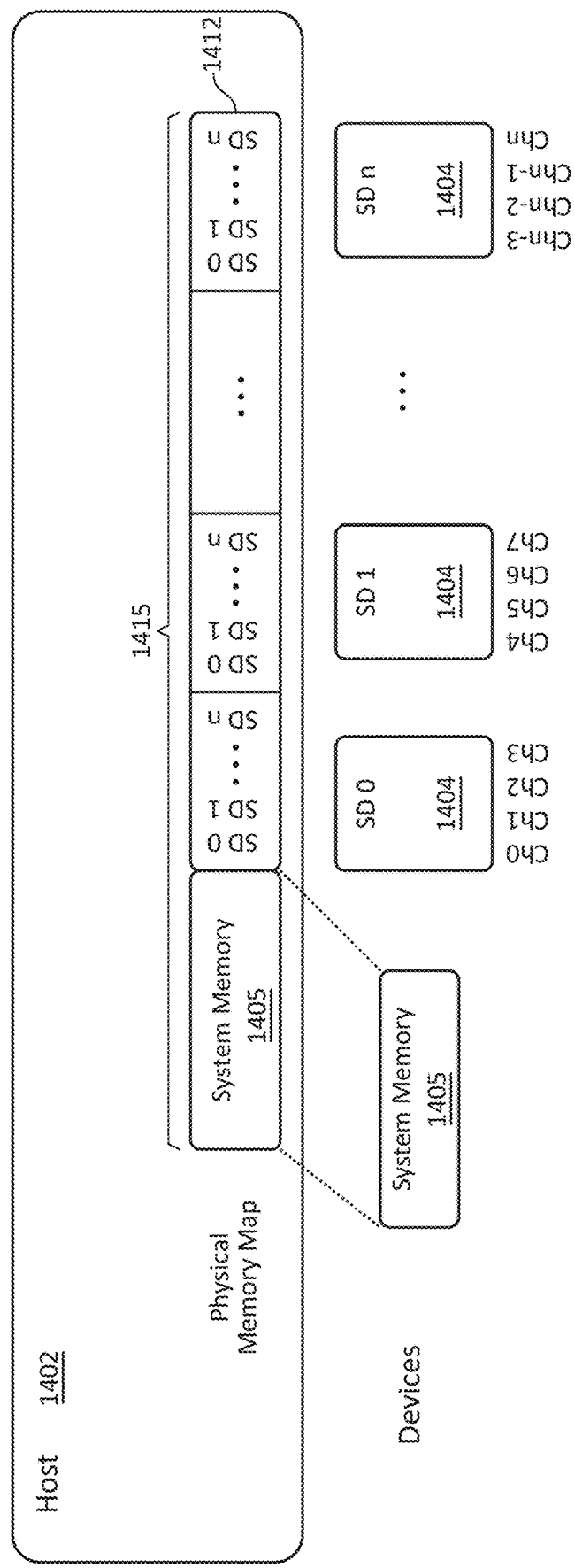
FIG. 14B illustrates an embodiment of an addressing scheme having device interleaving and channel interleaving in accordance with example embodiments of the disclosure.

FIG. 14B illustrates an embodiment of a device and channel interleaving scheme in accordance with example embodiments of the disclosure. The embodiment illustrated in FIG. 14B may include a host 1402, a system memory 1405, and one or more storage devices 1404 indicated as SD 0, . . . , SD n. The one or more storage devices 1404 may be mapped as device attached memory 1412 in a physical memory map 1415 that may include a system memory 1405 (e.g., a host memory that may be implemented with DRAM).

As with the device interleaving scheme illustrated in FIG. 14A, the scheme illustrated in FIG. 14B may include device interleaving in which consecutive pages of the physical memory map 1415 may belong to different storage devices 1404. However, the scheme illustrated in FIG. 14B may also include channel interleaving in which the channels within each device may be remapped to consecutive channel addresses as shown in FIG. 14B. In such an embodiment, device selection logic may not be needed. Instead, channel selection logic may select any of the channels across some or all of the devices 1404.

The scheme illustrated in FIG. 14B may be used, for example, with any of the memory allocators having channel selection logic disclosed herein such as those illustrated in FIG. 2B and FIG. 3.

In some embodiments, one or more storage devices in a memory system in accordance with example embodiments of the disclosure may implement one or more of the address interleaving schemes illustrated in FIGS. 4A-4C, FIGS. 13A-13B, and/or FIGS. 14A-14B. An address interleaving scheme may be determined, for example, by the storage device and/or by a basic input/output system (BIOS). In some embodiments, the storage device may report the one or more address interleaving schemes it may be using to a host. A memory allocator in the host (which may include, for example, device selection logic, channel selection logic, and/or page allocation logic) may then coordinate any of the utilization aware memory allocation schemes disclosed herein with the one or more address interleaving schemes used by the storage device. Depending on the implementation details, this may enable the memory allocator to manage a utilization aware memory allocation scheme more efficiently.

Figure 15:
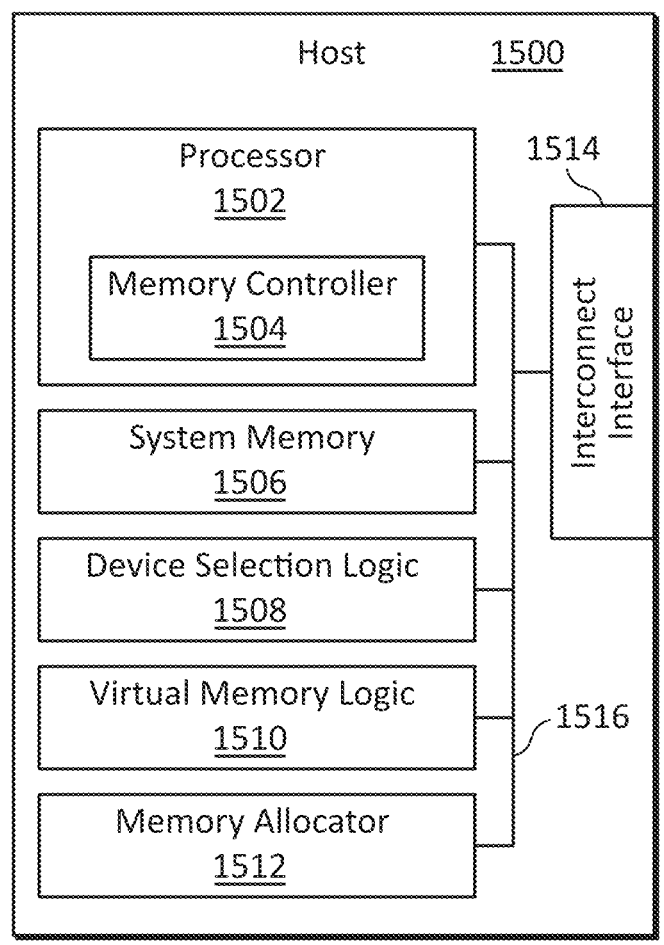
FIG. 15 illustrates an example embodiment of a host apparatus that may be used to implement a utilization aware memory allocation scheme in accordance with example embodiments of the disclosure.

FIG. 15 illustrates an example embodiment of a host apparatus that may be used to implement a utilization aware memory allocation scheme in accordance with example embodiments of the disclosure. The host apparatus 1500 illustrated in FIG. 15 may include a processor 1502, which may include a memory controller 1504, a system memory 1506, device selection logic 1508, virtual memory logic 1510, a memory allocator 1512, and/or a interconnect interface 1514, which may be implemented, for example using CXL. Any or all of the components illustrated in FIG. 15 may communicate through one or more system buses 1516. In some embodiments, the host apparatus 1500 illustrated in FIG. 15 may be used to implement any of the host functionality disclosed herein including device and/or channel selection base on utilization. In some embodiments, one or more of the components illustrated in FIG. 15 may be implemented using other components. For example, in some embodiments, one or more of the device selection logic 1508, virtual memory logic 1510, and/or memory allocator 1512 may be implemented, for example, by the processor 1502 executing instructions stored in the system memory 1506 or other memory.

Figure 16:
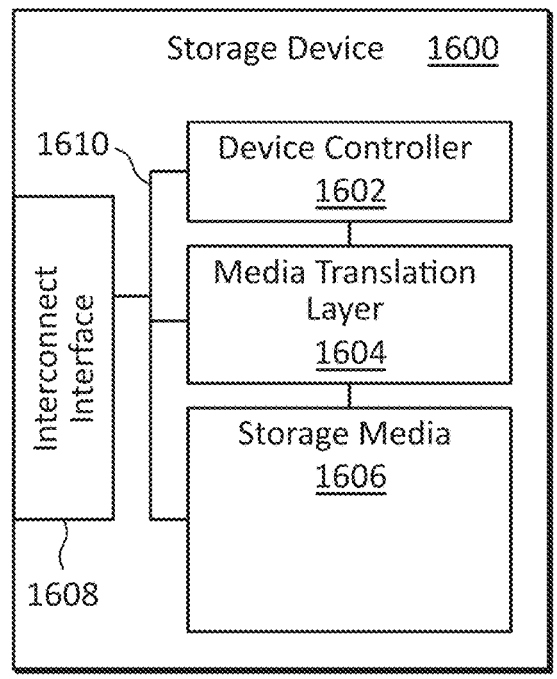
FIG. 16 illustrates an example embodiment of a storage device that may be used to implement a page relocation scheme for a garbage collection operation in accordance with example embodiments of the disclosure.

FIG. 16 illustrates an example embodiment of a storage device that may be used to implement a utilization aware memory allocation scheme in accordance with example embodiments of the disclosure. The storage device 1600 may include a device controller 1602, a media translation layer 1604, a storage media 1606, and an interconnect interface 1608. The components illustrated in FIG. 16 may communicate through one or more device buses 1610. In some embodiments that may use flash memory for some or all of the storage media 1606, the media translation layer 1604 may be implemented partially or entirely as a flash translation layer (FTL). In some embodiments, the storage device 1600 illustrated in FIG. 16 may be used to implement any of the device-side functionality relating to utilization aware memory allocation disclosed herein. For example, the device controller 1602 and/or media translation layer 1604 may be used to implement some or all of the core selection logic, channel selection logic, page allocation logic, and/or the like.

Any of the functionality described herein, including any of the host functionality, device functionally, and/or the like described with respect to FIGS. 1-17, for example, the device selection logic, channel selection logic, page allocation logic, and/or the like, may be implemented with hardware, software, or any combination thereof including combinational logic, sequential logic, one or more timers, counters, registers, state machines, volatile memories such as DRAM and/or static random access memory (SRAM), nonvolatile memory and/or any combination thereof, complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), and/or the like, executing instructions stored in any type of memory. In some embodiments, one or more components may be implemented as a system-on-chip (SOC).

Any of the storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Any of the storage devices disclosed herein may communicate through any interfaces and/or protocols including Peripheral Component Interconnect Express (PCIe), Nonvolatile Memory Express (NVMe), NVMe-over-fabric (NVMe-oF), Ethernet, Transmission Control Protocol/Internet Protocol (TCP/IP), remote direct memory access (RDMA), RDMA over Converged Ethernet (ROCE), Fibre-Channel, InfiniBand, Serial ATA (SATA), Small Computer Systems Interface (SCSI), Serial Attached SCSI (SAS), iWARP, and/or the like, or any combination thereof.

Figure 17:
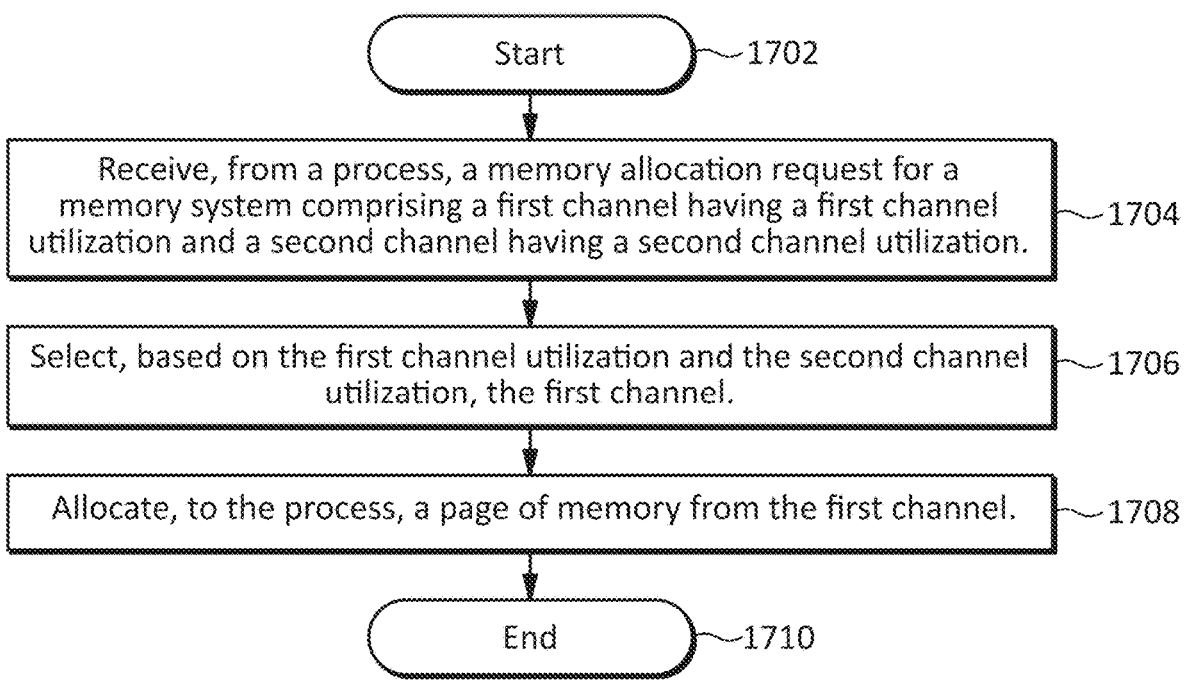
FIG. 17 illustrates an embodiment of a method for page management in a memory system operation in accordance with example embodiments of the disclosure.

FIG. 17 illustrates an embodiment of a method for memory allocation in accordance with example embodiments of the disclosure. The method may begin at operation 1702. At operation 1704, the method may receive, from a process, a memory allocation request for a memory system comprising a first channel having a first channel utilization and a second channel having a second channel utilization. In some embodiments, the first and second channels may be implemented, for example, in a storage device. At operation 1706, the method may select, based on the first channel utilization and the second channel utilization, the first channel. In some embodiments, the first channel may be selected based on a balanced random policy, a least used channel first service policy, and/or the like. At operation 1708, the method may allocate, to the process, a page of memory from the first channel. In some embodiments, the allocated page may be mapped dynamically within the first channel. The method may end at operation 1710.

The embodiment illustrated in FIG. 17, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for memory allocation, the method comprising:
receiving, from a process, a memory allocation request for a memory system comprising a first channel having a first channel utilization and a second channel having a second channel utilization, wherein the memory system comprises one or more pages of memory arranged in a first page group and a second page group, wherein the first page group and second page group correspond to a number of unallocated pages;
performing a first selection, based on the first channel utilization and the second channel utilization, of the first channel;
performing, based on the first selection, a second selection of the first page group, wherein the first page group comprises the first channel; and
allocating, to the process, a page of memory from the first page group.

2. The method of claim 1, wherein the performing the first selection comprises selecting the first channel based on an amount of free memory in the first channel, an amount of free memory in the second channel, and a random number.

3. The method of claim 1, wherein the performing the first selection comprises:
generating a value based on a random number and a number of free pages;
comparing the value to a number of free pages of the first channel; and
selecting the first channel based on the comparing.

4. The method of claim 1, wherein the performing the first selection comprises selecting the first channel based on a least used channel policy.

5. The method of claim 1, wherein the performing the first selection comprises:
comparing a first number of free pages of the first channel to a second number of free pages of the second channel; and
selecting the first channel based on the comparing.

6. The method of claim 1, wherein a page frame number for the page of memory from the first channel comprises a channel identifier portion.

7. The method of claim 1, wherein:
the memory allocation request comprises a requested order; and
the allocating comprises checking the first page group, wherein the one or more pages of the first group are based on a first order and arranged by channel.

8. The method of claim 7, wherein:
a first list, corresponding to the first channel, of the one or more lists of pages of the first group comprises an entry for a page of the requested order; and
the allocating further comprises allocating, to the process, the page of the requested order from the first list of the one or more lists of pages of the first group.

9. The method of claim 7, wherein the allocating further comprises checking the second page group, wherein the one or more pages of the second group are based on a second order and arranged by channel.

10. The method of claim 9 wherein:
a first list, corresponding to the first channel, of the one or more pages of the second page group comprises an entry for a page of the requested order; and
the allocating further comprises allocating, to the process, the page of the requested order from the first list of the one or more pages of the second page group.

11. The method of claim 1, wherein:
the memory system comprises a first media core and a second media core;
the first channel is associated with the first media core; and
the second channel is associated with the second media core.

12. The method of claim 1, wherein:
the memory system comprises a first device having a first device utilization and a second device having a second device utilization;
the first channel and the second channel are associated with the first device; and
the method further comprises selecting, based on the first device utilization and the second device utilization, the first device for the memory allocation request.

13. A system comprising:
a first storage device comprising:
a first channel having a first channel utilization; and
a second channel having a second channel utilization;
a second storage device; and
channel selection logic configured to:
perform a first selection of the first storage device based on a memory allocation request, a first utilization of the first storage device, and a second utilization of the second storage device;
perform a second selection of a first page group based on the memory allocation request, the first selection, the first channel utilization, and the second channel utilization, wherein the first page group comprises the first channel and wherein the first page group corresponds to a number of unallocated pages; and
allocate a page of memory of the first first page group.

14. The system of claim 13, wherein:
the first storage device comprises a first memory coherent interface; and
the second storage device comprises a second memory coherent interface.

15. The system of claim 14, wherein the page of memory is configured as device attached memory.

16. The system of claim 13, wherein:
the first storage device comprises a first media core and a second media core;
the first channel is associated with the first media core; and
the second channel is associated with the second media core.

17. An apparatus comprising:
a memory allocator configured to receive, from a process, a memory allocation request, the memory allocator comprising channel selection logic configured to:
select, based on a first channel utilization of a first memory channel, a second channel utilization of a second memory channel, and a random policy, the first memory channel;
perform, based on the first memory channel, a selection of a first page group, wherein the first page group comprises the first memory channel and wherein the first page group corresponds to a number of unallocated pages; and
allocate, to the process, one or more pages of memory from the first page group.

18. The apparatus of claim 17, wherein:
the first memory channel is associated with a first device having a first device utilization;
the second memory channel is associated with a second device having a second device utilization; and
the memory allocator further comprises device selection logic configured to select, based on the first device utilization and the second device utilization, the first device for the memory allocation request.

19. The apparatus of claim 17, wherein the memory allocator further comprises page allocation logic configured to allocate the one or more pages of memory from the first page group based on an order of the memory allocation request.

* * * * *